United States Patent
Paithane et al.

(10) Patent No.: US 10,887,328 B1
(45) Date of Patent: *Jan. 5, 2021

(54) SYSTEM AND METHOD FOR DETECTING INTERPRETER-BASED EXPLOIT ATTACKS

(71) Applicant: FireEye, Inc., Milpitas, CA (US)

(72) Inventors: Sushant Paithane, Sunnyvale, CA (US); Sai Omkar Vashisht, Morgan Hill, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/042,998

(22) Filed: Jul. 23, 2018

Related U.S. Application Data

(63) Continuation of application No. 14/869,901, filed on Sep. 29, 2015, now Pat. No. 10,033,747.

(51) Int. Cl.
*G06F 21/56* (2013.01)
*H04L 29/06* (2006.01)
(Continued)

(52) U.S. Cl.
CPC ........ *H04L 63/1416* (2013.01); *G06F 21/554* (2013.01); *G06F 21/566* (2013.01);
(Continued)

(58) Field of Classification Search
CPC ........ G06F 21/566; G06F 21/52; G06F 21/55; G06F 21/50; G06F 21/53; G06F 21/54;
(Continued)

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| GB | 2439806 A | 1/2008 |
| GB | 2490431 A | 10/2012 |

(Continued)

OTHER PUBLICATIONS

D. Blazakis, "Interpreter exploitation," in Workshop on Offensive Technologies (WOOT), 2010.*

(Continued)

*Primary Examiner* — Farid Homayounmehr
*Assistant Examiner* — Zhimei Zhu
(74) *Attorney, Agent, or Firm* — Rutan & Tucker, LLP

(57) ABSTRACT

For one embodiment, a computerized method for detecting exploit attacks on an interpreter comprises configuring a virtual machine including a user mode and a kernel mode and processing an object by an application operating in the user mode of the virtual machine. Responsive to the processing of the object, detecting a loading of an interpreter. Furthermore, responsive to the loading of the interpreter, inserting one or more intercept points for detecting one or more types of software calls from the interpreter or for detecting a certain type or certain types of activities occurring within the interpreter. Thereafter, an exploit attack is detected as being conducted by the object in response to the interpreter invoking a software call that corresponds to the one or more types of software calls that is considered anomalous when invoked by the interpreter or an anomalous activity being conducted within the interpreter.

41 Claims, 6 Drawing Sheets

(51) Int. Cl.
  *G06F 21/55* (2013.01)
  *G06F 21/53* (2013.01)
(52) U.S. Cl.
  CPC ...... *H04L 63/1425* (2013.01); *H04L 63/1466* (2013.01); *G06F 21/53* (2013.01)
(58) Field of Classification Search
  CPC .................. G06F 21/554; H04L 63/1416; H04L 63/1466
  See application file for complete search history.

(56) References Cited

U.S. PATENT DOCUMENTS

| | | | |
|---|---|---|---|
| 5,319,776 | A | 6/1994 | Hile et al. |
| 5,440,723 | A | 8/1995 | Arnold et al. |
| 5,490,249 | A | 2/1996 | Miller |
| 5,657,473 | A | 8/1997 | Killean et al. |
| 5,781,714 | A | 7/1998 | Collins et al. |
| 5,802,277 | A | 9/1998 | Cowlard |
| 5,842,002 | A | 11/1998 | Schnurer et al. |
| 5,960,170 | A | 9/1999 | Chen et al. |
| 5,978,917 | A | 11/1999 | Chi |
| 5,983,190 | A * | 11/1999 | Trower, II .................. G06F 8/00 704/275 |
| 5,983,348 | A | 11/1999 | Ji |
| 6,088,803 | A | 7/2000 | Tso et al. |
| 6,092,194 | A | 7/2000 | Touboul |
| 6,094,677 | A | 7/2000 | Capek et al. |
| 6,108,799 | A | 8/2000 | Boulay et al. |
| 6,154,844 | A | 11/2000 | Touboul et al. |
| 6,269,330 | B1 | 7/2001 | Cidon et al. |
| 6,272,641 | B1 | 8/2001 | Ji |
| 6,279,113 | B1 | 8/2001 | Vaidya |
| 6,298,445 | B1 | 10/2001 | Shostack et al. |
| 6,357,008 | B1 | 3/2002 | Nachenberg |
| 6,424,627 | B1 | 7/2002 | Sørhaug et al. |
| 6,442,696 | B1 | 8/2002 | Wray et al. |
| 6,484,315 | B1 | 11/2002 | Ziese |
| 6,487,666 | B1 | 11/2002 | Shanklin et al. |
| 6,493,756 | B1 | 12/2002 | O'Brien et al. |
| 6,550,012 | B1 | 4/2003 | Villa et al. |
| 6,775,657 | B1 | 8/2004 | Baker |
| 6,831,893 | B1 | 12/2004 | Ben Nun et al. |
| 6,832,367 | B1 | 12/2004 | Choi et al. |
| 6,874,149 | B1 | 3/2005 | Bermudez et al. |
| 6,895,550 | B2 | 5/2005 | Kanchirayappa et al. |
| 6,898,632 | B2 | 5/2005 | Gordy et al. |
| 6,907,396 | B1 | 6/2005 | Muttik et al. |
| 6,941,348 | B2 | 9/2005 | Petry et al. |
| 6,971,097 | B1 | 11/2005 | Wallman |
| 6,981,279 | B1 | 12/2005 | Arnold et al. |
| 7,007,107 | B1 | 2/2006 | Ivchenko et al. |
| 7,028,179 | B2 | 4/2006 | Anderson et al. |
| 7,043,757 | B2 | 5/2006 | Hoefelmeyer et al. |
| 7,058,822 | B2 | 6/2006 | Edery et al. |
| 7,069,316 | B1 | 6/2006 | Gryaznov |
| 7,080,407 | B1 | 7/2006 | Zhao et al. |
| 7,080,408 | B1 | 7/2006 | Pak et al. |
| 7,093,002 | B2 | 8/2006 | Wolff et al. |
| 7,093,239 | B1 | 8/2006 | van der Made |
| 7,096,498 | B2 | 8/2006 | Judge |
| 7,100,201 | B2 | 8/2006 | Izatt |
| 7,107,617 | B2 | 9/2006 | Hursey et al. |
| 7,159,149 | B2 | 1/2007 | Spiegel et al. |
| 7,213,260 | B2 | 5/2007 | Judge |
| 7,231,667 | B2 | 6/2007 | Jordan |
| 7,240,364 | B1 | 7/2007 | Branscomb et al. |
| 7,240,368 | B1 | 7/2007 | Roesch et al. |
| 7,243,371 | B1 | 7/2007 | Kasper et al. |
| 7,249,175 | B1 | 7/2007 | Donaldson |
| 7,287,278 | B2 | 10/2007 | Liang |
| 7,308,716 | B2 | 12/2007 | Danford et al. |
| 7,328,453 | B2 | 2/2008 | Merkle, Jr. et al. |
| 7,346,486 | B2 | 3/2008 | Ivancic et al. |
| 7,356,736 | B2 | 4/2008 | Natvig |
| 7,386,888 | B2 | 6/2008 | Liang et al. |
| 7,392,542 | B2 | 6/2008 | Bucher |
| 7,418,729 | B2 | 8/2008 | Szor |
| 7,428,300 | B1 | 9/2008 | Drew et al. |
| 7,441,272 | B2 | 10/2008 | Durham et al. |
| 7,448,084 | B1 | 11/2008 | Apap et al. |
| 7,458,098 | B2 | 11/2008 | Judge et al. |
| 7,464,404 | B2 | 12/2008 | Carpenter et al. |
| 7,464,407 | B2 | 12/2008 | Nakae et al. |
| 7,467,408 | B1 | 12/2008 | O'Toole, Jr. |
| 7,478,428 | B1 | 1/2009 | Thomlinson |
| 7,480,773 | B1 | 1/2009 | Reed |
| 7,487,543 | B2 | 2/2009 | Arnold et al. |
| 7,496,960 | B1 | 2/2009 | Chen et al. |
| 7,496,961 | B2 | 2/2009 | Zimmer et al. |
| 7,519,990 | B1 | 4/2009 | Xie |
| 7,523,493 | B2 | 4/2009 | Liang et al. |
| 7,530,104 | B1 | 5/2009 | Thrower et al. |
| 7,540,025 | B2 | 5/2009 | Tzadikario |
| 7,546,638 | B2 | 6/2009 | Anderson et al. |
| 7,565,550 | B2 | 7/2009 | Liang et al. |
| 7,568,233 | B1 | 7/2009 | Szor et al. |
| 7,584,455 | B2 | 9/2009 | Ball |
| 7,603,715 | B2 | 10/2009 | Costa et al. |
| 7,607,171 | B1 | 10/2009 | Marsden et al. |
| 7,639,714 | B2 | 12/2009 | Stolfo et al. |
| 7,644,441 | B2 | 1/2010 | Schmid et al. |
| 7,657,419 | B2 | 2/2010 | van der Made |
| 7,676,841 | B2 | 3/2010 | Sobchuk et al. |
| 7,685,638 | B1 * | 3/2010 | Buches .................. G06F 21/53 726/22 |
| 7,698,548 | B2 | 4/2010 | Shelest et al. |
| 7,707,633 | B2 | 4/2010 | Danford et al. |
| 7,712,136 | B2 | 5/2010 | Sprosts et al. |
| 7,730,011 | B1 | 6/2010 | Deninger et al. |
| 7,739,740 | B1 | 6/2010 | Nachenberg et al. |
| 7,779,463 | B2 | 8/2010 | Stolfo et al. |
| 7,784,097 | B1 | 8/2010 | Stolfo et al. |
| 7,832,008 | B1 | 11/2010 | Kraemer |
| 7,836,502 | B1 | 11/2010 | Zhao et al. |
| 7,849,506 | B1 | 12/2010 | Dansey et al. |
| 7,854,007 | B2 | 12/2010 | Sprosts et al. |
| 7,869,073 | B2 | 1/2011 | Oshima |
| 7,877,803 | B2 | 1/2011 | Enstone et al. |
| 7,904,959 | B2 | 3/2011 | Sidiroglou et al. |
| 7,908,660 | B2 | 3/2011 | Bahl |
| 7,930,738 | B1 | 4/2011 | Petersen |
| 7,937,387 | B2 | 5/2011 | Frazier et al. |
| 7,937,761 | B1 | 5/2011 | Bennett |
| 7,949,849 | B2 | 5/2011 | Lowe et al. |
| 7,962,961 | B1 * | 6/2011 | Griffin .................. G06F 21/566 709/224 |
| 7,996,556 | B2 | 8/2011 | Raghavan et al. |
| 7,996,836 | B1 | 8/2011 | McCorkendale et al. |
| 7,996,904 | B1 | 8/2011 | Chiueh et al. |
| 7,996,905 | B2 | 8/2011 | Arnold et al. |
| 8,006,305 | B2 | 8/2011 | Aziz |
| 8,010,667 | B2 | 8/2011 | Zhang et al. |
| 8,020,206 | B2 | 9/2011 | Hubbard et al. |
| 8,028,338 | B1 | 9/2011 | Schneider et al. |
| 8,042,184 | B1 | 10/2011 | Batenin |
| 8,045,094 | B2 | 10/2011 | Teragawa |
| 8,045,458 | B2 | 10/2011 | Alperovitch et al. |
| 8,069,484 | B2 | 11/2011 | McMillan et al. |
| 8,087,086 | B1 | 12/2011 | Lai et al. |
| 8,171,553 | B2 | 5/2012 | Aziz et al. |
| 8,176,049 | B2 | 5/2012 | Deninger et al. |
| 8,176,480 | B1 | 5/2012 | Spertus |
| 8,201,246 | B1 | 6/2012 | Wu et al. |
| 8,204,984 | B1 | 6/2012 | Aziz et al. |
| 8,214,905 | B1 | 7/2012 | Doukhvalov et al. |
| 8,220,055 | B1 | 7/2012 | Kennedy |
| 8,225,288 | B2 | 7/2012 | Miller et al. |
| 8,225,373 | B2 | 7/2012 | Kraemer |
| 8,233,882 | B2 | 7/2012 | Rogel |
| 8,234,640 | B1 | 7/2012 | Fitzgerald et al. |
| 8,234,709 | B2 | 7/2012 | Viljoen et al. |
| 8,239,944 | B1 | 8/2012 | Nachenberg et al. |
| 8,260,914 | B1 | 9/2012 | Ranjan |
| 8,266,091 | B1 | 9/2012 | Gubin et al. |

(56) References Cited

U.S. PATENT DOCUMENTS

| | | | |
|---|---|---|---|
| 8,286,251 B2 | 10/2012 | Eker et al. | |
| 8,291,499 B2 | 10/2012 | Aziz et al. | |
| 8,296,848 B1* | 10/2012 | Griffin | G06F 21/577 |
| | | | 715/201 |
| 8,307,435 B1 | 11/2012 | Mann et al. | |
| 8,307,443 B2 | 11/2012 | Wang et al. | |
| 8,312,545 B2 | 11/2012 | Tuvell et al. | |
| 8,321,936 B1 | 11/2012 | Green et al. | |
| 8,321,941 B2 | 11/2012 | Tuvell et al. | |
| 8,332,571 B1 | 12/2012 | Edwards, Sr. | |
| 8,365,286 B2 | 1/2013 | Poston | |
| 8,365,297 B1 | 1/2013 | Parshin et al. | |
| 8,370,938 B1 | 2/2013 | Daswani et al. | |
| 8,370,939 B2 | 2/2013 | Zaitsev et al. | |
| 8,375,444 B2 | 2/2013 | Aziz et al. | |
| 8,381,299 B2 | 2/2013 | Stolfo et al. | |
| 8,402,529 B1 | 3/2013 | Green et al. | |
| 8,464,340 B2 | 6/2013 | Ahn et al. | |
| 8,479,174 B2 | 7/2013 | Chiriac | |
| 8,479,276 B1 | 7/2013 | Vaystikh et al. | |
| 8,479,291 B1 | 7/2013 | Bodke | |
| 8,510,827 B1 | 8/2013 | Leake et al. | |
| 8,510,828 B1 | 8/2013 | Guo et al. | |
| 8,510,842 B2 | 8/2013 | Amit et al. | |
| 8,516,478 B1 | 8/2013 | Edwards et al. | |
| 8,516,590 B1 | 8/2013 | Ranadive et al. | |
| 8,516,593 B2 | 8/2013 | Aziz | |
| 8,522,348 B2 | 8/2013 | Chen et al. | |
| 8,528,086 B1 | 9/2013 | Aziz | |
| 8,533,824 B2 | 9/2013 | Hutton et al. | |
| 8,539,582 B1 | 9/2013 | Aziz et al. | |
| 8,549,638 B2 | 10/2013 | Aziz | |
| 8,555,391 B1 | 10/2013 | Demir et al. | |
| 8,561,177 B1 | 10/2013 | Aziz et al. | |
| 8,566,476 B2 | 10/2013 | Shiffer et al. | |
| 8,566,946 B1 | 10/2013 | Aziz et al. | |
| 8,584,094 B2 | 11/2013 | Dadhia et al. | |
| 8,584,234 B1 | 11/2013 | Sobel et al. | |
| 8,584,239 B2 | 11/2013 | Aziz et al. | |
| 8,595,834 B2* | 11/2013 | Xie | G06F 21/316 |
| | | | 726/22 |
| 8,627,476 B1 | 1/2014 | Satish et al. | |
| 8,635,696 B1 | 1/2014 | Aziz | |
| 8,682,054 B2 | 3/2014 | Xue et al. | |
| 8,682,812 B1 | 3/2014 | Ranjan | |
| 8,689,333 B2 | 4/2014 | Aziz | |
| 8,695,096 B1 | 4/2014 | Zhang | |
| 8,713,631 B1 | 4/2014 | Pavlyushchik | |
| 8,713,681 B2 | 4/2014 | Silberman et al. | |
| 8,726,392 B1 | 5/2014 | McCorkendale et al. | |
| 8,739,280 B2 | 5/2014 | Chess et al. | |
| 8,752,201 B2 | 6/2014 | Lee et al. | |
| 8,776,229 B1 | 7/2014 | Aziz | |
| 8,782,792 B1 | 7/2014 | Bodke | |
| 8,789,172 B2* | 7/2014 | Stolfo | G06F 21/56 |
| | | | 726/22 |
| 8,789,178 B2 | 7/2014 | Kejriwal et al. | |
| 8,793,278 B2 | 7/2014 | Frazier et al. | |
| 8,793,787 B2 | 7/2014 | Ismael et al. | |
| 8,805,947 B1 | 8/2014 | Kuzkin et al. | |
| 8,806,647 B1 | 8/2014 | Daswani et al. | |
| 8,832,829 B2 | 9/2014 | Manni et al. | |
| 8,844,032 B2* | 9/2014 | Saidi | G06F 21/6218 |
| | | | 726/22 |
| 8,850,570 B1 | 9/2014 | Ramzan | |
| 8,850,571 B2 | 9/2014 | Staniford et al. | |
| 8,850,581 B2* | 9/2014 | Wang | G06F 21/566 |
| | | | 726/23 |
| 8,881,234 B2 | 11/2014 | Narasimhan et al. | |
| 8,881,271 B2 | 11/2014 | Butler, II | |
| 8,881,278 B2 | 11/2014 | Kaplan et al. | |
| 8,881,282 B1 | 11/2014 | Aziz et al. | |
| 8,898,788 B1 | 11/2014 | Aziz et al. | |
| 8,935,779 B2 | 1/2015 | Manni et al. | |
| 8,949,257 B2 | 2/2015 | Shiffer et al. | |
| 8,950,007 B1* | 2/2015 | Teal | G06F 21/554 |
| | | | 726/30 |
| 8,984,638 B1 | 3/2015 | Aziz et al. | |
| 8,990,939 B2 | 3/2015 | Staniford et al. | |
| 8,990,944 B1 | 3/2015 | Singh et al. | |
| 8,997,219 B2 | 3/2015 | Staniford et al. | |
| 9,009,822 B1 | 4/2015 | Ismael et al. | |
| 9,009,823 B1 | 4/2015 | Ismael et al. | |
| 9,027,135 B1 | 5/2015 | Aziz | |
| 9,071,638 B1 | 6/2015 | Aziz et al. | |
| 9,092,625 B1* | 7/2015 | Kashyap | G06F 21/566 |
| 9,104,867 B1 | 8/2015 | Thioux et al. | |
| 9,106,630 B2 | 8/2015 | Frazier et al. | |
| 9,106,694 B2 | 8/2015 | Aziz et al. | |
| 9,117,079 B1 | 8/2015 | Huang et al. | |
| 9,118,715 B2 | 8/2015 | Staniford et al. | |
| 9,159,035 B1 | 10/2015 | Ismael et al. | |
| 9,171,160 B2 | 10/2015 | Vincent et al. | |
| 9,176,843 B1 | 11/2015 | Ismael et al. | |
| 9,189,627 B1 | 11/2015 | Islam | |
| 9,195,829 B1 | 11/2015 | Goradia et al. | |
| 9,197,664 B1 | 11/2015 | Aziz et al. | |
| 9,202,054 B1* | 12/2015 | Lu | G06F 21/566 |
| 9,223,964 B2* | 12/2015 | Sun | G06F 21/53 |
| 9,223,972 B1 | 12/2015 | Vincent et al. | |
| 9,225,740 B1 | 12/2015 | Ismael et al. | |
| 9,239,922 B1* | 1/2016 | Zhu | G06F 21/56 |
| 9,241,010 B1 | 1/2016 | Bennett et al. | |
| 9,251,343 B1 | 2/2016 | Vincent et al. | |
| 9,262,635 B2 | 2/2016 | Paithane et al. | |
| 9,268,936 B2 | 2/2016 | Butler | |
| 9,275,229 B2 | 3/2016 | LeMasters | |
| 9,282,109 B1 | 3/2016 | Aziz et al. | |
| 9,292,686 B2 | 3/2016 | Ismael et al. | |
| 9,294,501 B2 | 3/2016 | Mesdaq et al. | |
| 9,300,686 B2 | 3/2016 | Pidathala et al. | |
| 9,306,960 B1 | 4/2016 | Aziz | |
| 9,306,974 B1 | 4/2016 | Aziz et al. | |
| 9,311,479 B1 | 4/2016 | Manni et al. | |
| 9,355,247 B1 | 5/2016 | Thioux et al. | |
| 9,356,944 B1 | 5/2016 | Aziz | |
| 9,363,280 B1 | 6/2016 | Rivlin et al. | |
| 9,367,681 B1 | 6/2016 | Ismael et al. | |
| 9,398,028 B1 | 7/2016 | Karandikar et al. | |
| 9,413,774 B1* | 8/2016 | Liu | H04L 63/1416 |
| 9,413,781 B2 | 8/2016 | Cunningham et al. | |
| 9,426,071 B1 | 8/2016 | Caldejon et al. | |
| 9,430,646 B1 | 8/2016 | Mushtaq et al. | |
| 9,432,389 B1 | 8/2016 | Khalid et al. | |
| 9,438,613 B1 | 9/2016 | Paithane et al. | |
| 9,438,622 B1 | 9/2016 | Staniford et al. | |
| 9,438,623 B1 | 9/2016 | Thioux et al. | |
| 9,459,901 B2 | 10/2016 | Jung et al. | |
| 9,460,284 B1* | 10/2016 | Hajmasan | G06F 21/566 |
| 9,467,460 B1 | 10/2016 | Otvagin et al. | |
| 9,483,644 B1 | 11/2016 | Paithane et al. | |
| 9,495,180 B2 | 11/2016 | Ismael | |
| 9,497,213 B2 | 11/2016 | Thompson et al. | |
| 9,507,935 B2 | 11/2016 | Ismael et al. | |
| 9,516,057 B2 | 12/2016 | Aziz | |
| 9,519,782 B2 | 12/2016 | Aziz et al. | |
| 9,524,154 B2* | 12/2016 | Jawa | G06F 21/53 |
| 9,536,091 B2 | 1/2017 | Paithane et al. | |
| 9,537,972 B1 | 1/2017 | Edwards et al. | |
| 9,560,059 B1 | 1/2017 | Islam | |
| 9,565,202 B1 | 2/2017 | Kindlund et al. | |
| 9,591,015 B1 | 3/2017 | Amin et al. | |
| 9,591,020 B1* | 3/2017 | Aziz | H04L 63/1425 |
| 9,594,904 B1 | 3/2017 | Jain et al. | |
| 9,594,905 B1 | 3/2017 | Ismael et al. | |
| 9,594,912 B1 | 3/2017 | Thioux et al. | |
| 9,609,007 B1 | 3/2017 | Rivlin et al. | |
| 9,626,509 B1 | 4/2017 | Khalid et al. | |
| 9,628,498 B1 | 4/2017 | Aziz et al. | |
| 9,628,507 B2 | 4/2017 | Haq et al. | |
| 9,633,134 B2 | 4/2017 | Ross | |
| 9,635,039 B1 | 4/2017 | Islam et al. | |
| 9,641,546 B1 | 5/2017 | Manni et al. | |

(56) References Cited

U.S. PATENT DOCUMENTS

| | | |
|---|---|---|
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,860 B1 * | 3/2018 | Banga .................. G06F 9/445 |
| 9,921,978 B1 | 3/2018 | Chan et al. |
| 9,922,192 B1 * | 3/2018 | Kashyap .............. G06F 21/566 |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 * | 7/2018 | Paithane ............ H04L 63/1416 |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 * | 1/2019 | Singh .................. G06F 21/562 |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0008703 A1 | 1/2002 | Merrill et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0039172 A1 * | 2/2005 | Rees .................. G06F 11/3612 |
| | | 717/130 |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0198246 A1 * | 9/2005 | Kegel .................. H04L 43/50 |
| | | 709/223 |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |

(56) References Cited

U.S. PATENT DOCUMENTS

| | | |
|---|---|---|
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0113282 A1* | 5/2007 | Ross .................. G06F 21/52 726/22 |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1* | 7/2007 | Gribble .............. G06F 21/53 726/24 |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1* | 3/2008 | Liu ..................... G06F 21/562 726/24 |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0083012 A1* | 4/2008 | Yu .................. G06F 21/50 726/1 |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077664 A1* | 3/2009 | Hsu .................. G06F 21/566 726/24 |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0193497 A1* | 7/2009 | Kikuchi ............ G06F 21/54 726/1 |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1* | 10/2009 | Zhang ............... G06F 21/56 726/24 |
| 2009/0300415 A1 | 12/2009 | Zhang et al. |
| 2009/0300761 A1 | 12/2009 | Park et al. |
| 2009/0300764 A1* | 12/2009 | Freeman ............ G06F 21/55 726/24 |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043072 A1* | 2/2010 | Rothwell ........... G06F 21/566 726/24 |
| 2010/0043073 A1 | 2/2010 | Kuwamura |
| 2010/0054278 A1 | 3/2010 | Stolfo et al. |

(56) References Cited

U.S. PATENT DOCUMENTS

| | | |
|---|---|---|
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314457 A1* | 12/2011 | Schaude ............... G06F 9/4482 717/139 |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0055256 A1* | 2/2013 | Banga ..................... G06F 21/53 718/1 |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0275952 A1* | 10/2013 | Dalcher ................ G06F 21/554 717/127 |
| 2013/0276056 A1* | 10/2013 | Epstein ................ G06F 21/604 726/1 |
| 2013/0291109 A1 | 10/2013 | Staniford et al. |
| 2013/0298243 A1 | 11/2013 | Kumar et al. |
| 2013/0312093 A1* | 11/2013 | Hirvonen ............... G06F 21/554 726/22 |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0090054 A1* | 3/2014 | Bolzoni ................ H04L 63/0245 726/22 |
| 2014/0122052 A1* | 5/2014 | Liu ........................... G06F 21/54 703/23 |
| 2014/0123137 A1* | 5/2014 | Liu ........................... G06F 21/51 718/1 |
| 2014/0123282 A1* | 5/2014 | Liu ........................ G06F 21/566 726/23 |
| 2014/0123283 A1* | 5/2014 | Liu ........................ G06F 21/566 726/23 |
| 2014/0123284 A1* | 5/2014 | Liu ........................... G06F 21/53 726/23 |
| 2014/0130158 A1 | 5/2014 | Wang et al. |
| 2014/0137180 A1 | 5/2014 | Lukacs et al. |
| 2014/0143763 A1* | 5/2014 | Bhargava ................ G06F 8/20 717/139 |
| 2014/0169762 A1 | 6/2014 | Ryu |
| 2014/0179360 A1 | 6/2014 | Jackson et al. |
| 2014/0181131 A1 | 6/2014 | Ross |
| 2014/0181591 A1* | 6/2014 | Bijanki ................ G06F 11/3684 714/38.1 |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |

(56) References Cited

U.S. PATENT DOCUMENTS

| | | | |
|---|---|---|---|
| 2014/0380474 | A1 | 12/2014 | Paithane et al. |
| 2015/0007312 | A1 | 1/2015 | Pidathala et al. |
| 2015/0096022 | A1 | 4/2015 | Vincent et al. |
| 2015/0096023 | A1 | 4/2015 | Mesdaq et al. |
| 2015/0096024 | A1 | 4/2015 | Haq et al. |
| 2015/0096025 | A1 | 4/2015 | Ismael |
| 2015/0180886 | A1 | 6/2015 | Staniford et al. |
| 2015/0186296 | A1* | 7/2015 | Guidry ............... G06F 21/54 713/193 |
| 2015/0186645 | A1 | 7/2015 | Aziz et al. |
| 2015/0199513 | A1 | 7/2015 | Ismael et al. |
| 2015/0199531 | A1* | 7/2015 | Ismael ............. G06F 9/45533 726/30 |
| 2015/0199532 | A1 | 7/2015 | Ismael et al. |
| 2015/0220735 | A1 | 8/2015 | Paithane et al. |
| 2015/0372980 | A1 | 12/2015 | Eyada |
| 2016/0004869 | A1 | 1/2016 | Ismael et al. |
| 2016/0006756 | A1 | 1/2016 | Ismael et al. |
| 2016/0006758 | A1* | 1/2016 | Holt ................. H04L 63/1466 726/23 |
| 2016/0044000 | A1 | 2/2016 | Cunningham |
| 2016/0127393 | A1 | 5/2016 | Aziz et al. |
| 2016/0180086 | A1* | 6/2016 | Ladikov ............. G06F 21/51 726/23 |
| 2016/0191547 | A1* | 6/2016 | Zafar ............... H04L 63/1416 726/23 |
| 2016/0191550 | A1 | 6/2016 | Ismael et al. |
| 2016/0261612 | A1 | 9/2016 | Mesdaq et al. |
| 2016/0285914 | A1 | 9/2016 | Singh et al. |
| 2016/0301703 | A1 | 10/2016 | Aziz |
| 2016/0335110 | A1 | 11/2016 | Paithane et al. |
| 2016/0359875 | A1* | 12/2016 | Kim ................. H04L 63/1416 |
| 2017/0039366 | A1* | 2/2017 | Ionescu ............. G06F 9/545 |
| 2017/0039367 | A1* | 2/2017 | Ionescu ............. G06F 21/52 |
| 2017/0076092 | A1* | 3/2017 | Kashyap ........... G06F 9/45533 |
| 2017/0083703 | A1 | 3/2017 | Abbasi et al. |
| 2017/0228541 | A1* | 8/2017 | Takata ............. G06F 21/566 |
| 2018/0013770 | A1 | 1/2018 | Ismael |
| 2018/0048660 | A1 | 2/2018 | Paithane et al. |
| 2018/0121316 | A1 | 5/2018 | Ismael et al. |
| 2018/0288077 | A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

Crane, Stephen and Larsen, Per and Brunthaler, Stefan and Franz, Michael, "Booby Trapping Software", 2013, Proceedings of the 2013 New Security Paradigms Workshop, pp. 95-106.*

Robert Bradley Gilbert, "Defending Against Malicious Software", 2011, PhD thesis, obtained online from < https://citeseerx.ist.psu.edu/viewdoc/download?doi=10.1.1.472.5793&rep=rep1&type=pdf>, retrieved on Aug. 24, 2020.*

Chen, Haogang and Cutler, Cody and Kim, Taesoo and Mao, Yandong and Wang, Xi and Zeldovich, Nickolai and Kaashoek, M. Frans, "Security Bugs in Embedded Interpreters", Jul. 2013, Proceedings of the 4th Asia-Pacific Workshop on Systems, Article No. 17 pp. 1-7.*

"Mining Specification of Malicious Behavior"—Jha et al, UCSB, Sep. 2007 https://www.cs.ucsb.edu/.about.chris/research/doc/esec07.sub.—mining.pdf-.

"Network Security: NetDetector—Network Intrusion Forensic System (NIFS) Whitepaper", ("NetDetector Whitepaper"), (2003).

"Packet", Microsoft Computer Dictionary, Microsoft Press, (Mar. 2002), 1 page.

"When Virtual is Better Than Real", IEEEXplore Digital Library, available at, http://ieeexplore.ieee.org/xpl/articleDetails.sp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

AltaVista Advanced Search Results. "attack vector identifier". Http://www.altavista.com/web/results?ltag=ody&pg=aq&aqmode=aqa=Event+Orch- estrator . . . , (Accessed on Sep. 15, 2009).

AltaVista Advanced Search Results. "Event Orchestrator". Http://www.altavista.com/web/results?ltag=ody&pg=aq&aqmode=aqa=Event+Orch- esrator . . . , (Accessed on Sep. 3, 2009).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cisco, Configuring the Catalyst Switched Port Analyzer (SPAN) ("Cisco"), (1992).

Clark, John, Sylvian Leblanc,and Scott Knight. "Risks associated with usb hardware trojan devices used by insiders." Systems Conference (SysCon), 2011 IEEE International. IEEE, 2011.

Cohen, M.I. , "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).

Crandall, J.R. , et al., "Minos:Control Data Attack Prevention Orthogonal to Memory Model", 37th International Symposium on Microarchitecture, Portland, Oregon, (Dec. 2004).

Deutsch, P. , "Zlib compressed data format specification version 3.3" RFC 1950, (1996).

Distler, "Malware Analysis: An Introduction", SANS Institute InfoSec Reading Room, SANS Institute, (2007).

Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

Excerpt regarding First Printing Date for Merike Kaeo, Designing Network Security ("Kaeo"), (2005).

Filiol, Eric , et al., "Combinatorial Optimisation of Worm Propagation on an Unknown Network", International Journal of Computer Science 2.2 (2007).

FireEye Malware Analysis & Exchange Network, Malware Protection System, FireEye Inc., 2010.

(56) References Cited

OTHER PUBLICATIONS

FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hjelmvik, Erik , "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField= Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max , et al., Universal TUN/TAP driver, available at https://www.kernel.org/doc/Documentation/networking/tuntap.txt (2002) ("Krasnyansky").
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Liljenstam, Michael , et al., "Simulating Realistic Network Traffic for Worm Warning System Design and Testing", Institute for Security Technology studies, Dartmouth College ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].
Marchette, David J., "Computer Intrusion Detection and Network Monitoring: A Statistical Viewpoint", ("Marchette"), (2001).
Margolis, P.E. , "Random House Webster's 'Computer & Internet Dictionary 3rd Edition'", ISBN 0375703519, (Dec. 1998).
Mateusz Jurczyk, "One font vulnerability to rule them all #1: Introducing the BLEND vulnerability", Jul. 31, 2015, retrieved from <https://web.archive.org/web/20150810211942/https://googleprojectzero.-blogspot.com/2015/07/one-font-vulnerability-to-rule-them-all.html>, retrieved on May 7, 2017.
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Newsome, J. , et al., "Polygraph: Automatically Generating Signatures for Polymorphic Worms", In Proceedings of the IEEE Symposium on Security and Privacy, (May 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
O. Hallaraker and G. Vigna, "Detecting malicious JavaScript code in Mozilla," 10th IEEE International Conference on Engineering of Complex Computer Systems (ICECCS'05), 2005, pp. 85-94.
Oberheide et al., CloudAV.sub.—N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Spitzner, Lance , "Honeypots: Tracking Hackers", ("Spizner"), (Sep. 17, 2002).
The Sniffers's Guide to Raw Traffic available at: yuba.stanford.edu/.about.casado/pcap/section1.html, (Jan. 6, 2014).
Thomas H. Ptacek, and Timothy N. Newsham , "Insertion, Evasion, and Denial of Service: Eluding Network Intrusion Detection", Secure Networks, ("Ptacek"), (Jan. 1998).
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul , "NetDetector Captures Intrusions", InfoWorld Issue 27, ("Venezia"), (Jul. 14, 2003).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Youngjoon Ki, Eunjin Kim, and Huy Kang Kim. 2015. A novel approach to detect malware based on API call sequence analysis. Int. J. Distrib. Sen. Netw. 2015, Article 4 (Jan. 2015).
Yuhei Kawakoya et al: "Memory behavior-based automatic malware unpacking in stealth debugging environment", Malicious and Unwanted Software (Malware), 2010 5th International Conference

(56) References Cited

OTHER PUBLICATIONS on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Hiroshi Shinotsuka, Malware Authors Using New Techniques to Evade Automated Threat Analysis Systems, Oct. 26, 2012, http://www.symantec.com/connect/blogs/, pp. 1-4.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Lastline Labs, The Threat of Evasive Malware, Feb. 25, 2013, Lastline Labs, pp. 1-8.
U.S. Appl. No. 14/869,901, filed Sep. 29, 2015 Final Office Action dated Nov. 3, 2017.
U.S. Appl. No. 14/869,901, filed Sep. 29, 2015 Non-Final Office Action dated May 16, 2017.
U.S. Appl. No. 14/869,901, filed Sep. 29, 2015 Notice of Allowance dated Apr. 19, 2018.
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

\* cited by examiner

SYSTEM AND METHOD FOR DETECTING INTERPRETER-BASED EXPLOIT ATTACKS

CROSS-REFERENCE TO RELATED APPLICATIONS

This application is a continuation application of U.S. patent application Ser. No. 14/869,901 filed Sep. 29, 2015, now U.S. Pat. No. 10,033,747 issued Jul. 24, 2018, the entire contents of both of which are incorporated by reference herein.

FIELD

Embodiments of the disclosure relate to the field of malware detection. More specifically, one embodiment of the disclosure relates to a threat detection system that is adapted to detect exploit attacks, especially on an interpreter deployed within in kernel mode or user mode.

GENERAL BACKGROUND

Over the last decade, network devices that access the Internet or other publicly accessible networks have been increasingly subjected to malicious attacks. These malicious attacks may simply involve the use of stolen credentials by an unauthorized person in efforts to illicitly gain access to information stored within a network device. However, other malicious attacks may be more complex.

In general, a malicious attack may be carried out as an exploit attack. An exploit attack is an attempt to take advantage of a vulnerability in computer software or systems by adversely influencing or attacking normal operations of a targeted computer. Typically, exploit attacks are conducted as "user-mode" attacks, where a vulnerability associated with a specific application (e.g., web browser, PDF reader application, Microsoft® Office®) operating in user mode is targeted. In User mode (lesser privileged operating domain such as Ring-3), an executing application has no ability to directly access system resources (e.g., physical or virtual hardware). Instead, the executing application utilizes system-based functions, such as Application Programming Interfaces (APIs) for example, to access the system resources.

Recently, however, there have been an increased level of exploit attacks targeting certain plug-ins as software components operating within the kernel mode. The "kernel mode" is a privileged mode, where a processor in this mode can access the entire address space and execute the entire instruction set (privileged and non-privileged instructions). In kernel mode, an executing software component normally has complete and unrestricted access to the underlying system resources. Hence, kernel mode is generally reserved for low-level, trusted functions of the operating system. One of these targeted software components is a script interpreter.

A script interpreter is a software component that is configured to interpret and execute a script, namely code that is not native to an operating system for the electronic device targeted to receive the script, but features a higher level construct. The script interpreter typically translates content of the scripts (e.g., instructions within bytecode from an interpreted flash file, command lines from an interpreted JavaScript®, etc.) in context of a corresponding application. For ease of deployment, when a receiving electronic device is implemented with a particular script interpreter, such as kernel-based font interpreter (e.g., in win32k.sys) that is operating in kernel mode and having a higher privileged access to resources within the electronic device than an application running in the user mode for example, content within a received script is commonly translated from non-native to native code. In other words, the bytecode instructions or higher-level language code are translated without any consideration that the script may be malicious. Thereafter, after being interpreted (i.e. converted from non-native to native code for execution), the script is executed.

Scripts placed within documents or web pages are typically interpreted and executed within the application's container. This allows for vulnerabilities in the interpreter to be exploited by constructing specific conditions in the script, where early stage detection of an exploit attack on the interpreter is extremely difficult. Once an exploit is triggered, one type of malicious code injected by the script (referred to as "shellcode") may execute and compromise the receiving electronic device and perhaps an entire network if the malicious attack can propagate to other devices. The shellcode may cause the interpreter to perform operations beyond its limited functionality. Additionally, after the shellcode has executed, full remediation of the shellcode may be difficult to achieve.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Figure 1:
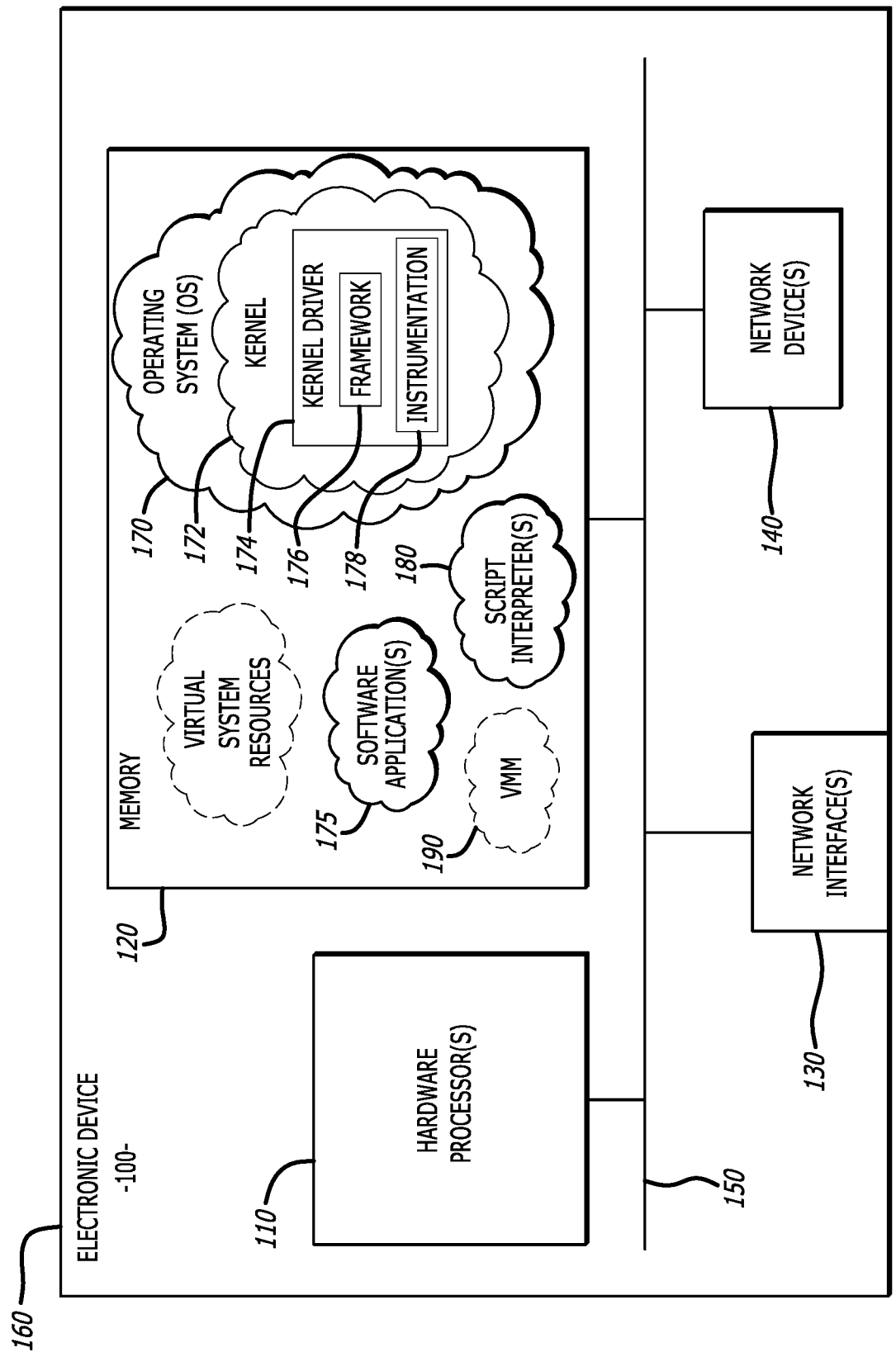
FIG. 1 is an exemplary block diagram of a physical representation of an electronic device.

Various embodiments of the disclosure are directed to a threat detection system for detecting and classifying malicious attacks, and in particular exploit attacks on particular software components. The critical commonality for these types of exploit attacks is that the software component, such as an interpreter operating in user mode or kernel mode, is tricked into invoking malicious code such as shellcode. "Shellcode" refers to a small piece of executable code that resides in data (e.g., injected into data), which is used as a payload of malware, and, in some cases, contains a shell command to execute an exploit. The interpreter is designed to perform a limited set of activities, which may include interpret certain instructions in a script. These activities may be monitored by monitoring signaling that is triggered from calls from an interpreter and/or operations conducted by the interpreter. The signaling from the interpreter may be monitored through intercept point (sometimes referred to as "hooks") to certain software calls (e.g., Application Programming Interface "API" call, library, procedure, function, or system call). The operations of the interpreter may be monitored through another type of intercept point (herein sometimes referred to as "instrumentation") into code closely operating with the interpreter code or within the interpreter code itself to detect a certain type of activity, which may include an activity prompting a particular software call, is anomalous (e.g., abnormal, unexpected, etc.).

An exploit attack on a particular interpreter may cause the interpreter, based on execution of the shellcode, to perform one or more activities beyond this limited set of activities. Hence, exploit attacks may be determined in response to the use of these intercept points to detect that (i) the functionality of the interpreter exceeds the expected functionality for that particular type of interpreter or (ii) the interpreter performs certain unexpected functionality being monitored. Herein, for a virtual machine based deployment, the interpreter may reside in kernel mode or user mode. In another deployment, the interpreter may be invoked during run-time.

More specifically, with respect to one embodiment of the disclosure, based on software contained in a memory and executed by one or more hardware processors, a virtual machine is adapted to include a kernel driver, which is configured with one or more interception point frameworks (hereinafter referred to as "interception point framework(s)") along with monitoring logic that collectively (i) detects certain types of activities that are outside the limited set of activities expected for a particular interpreter, (ii) determines that one or more of these detected activities are anomalous (e.g., unexpected, abnormal, etc.) upon confirmation that the particular interpreter initiated such activity through analysis of the calling hierarchy and other parameters (e.g., stack analysis or call trace review), and (iii) stores information associated with the anomalous activity. Hence, the detection and classification of exploit attacks on an interpreter focus on this behavior, where one or more activities conducted by the interpreter are anomalous, namely the one or more activities fall outside a correlated set of expected activities or fall within a correlated set of unexpected (abnormal) activities. The detection of one or more anomalous activities may indicate a potential exploit attack is being attempted.

According to one embodiment of the disclosure, the interception point framework(s) may include a hook framework, which detects certain activities involving system-related functions, including at least a presence of a function call that invokes a particular Application Programming Interface (API) for example, and tracks usage of that particular API. The hook framework may be configured to intercept (sometimes referred to as "hook") different types of API calls, depending on the type or the types of interpreters (e.g., Flash, JavaScript®, Virtual Basic "VB", etc.) being protected by the threat detection system. It is contemplated that "hooked" API calls monitored for one type of interpreter may be mutually exclusive or may include some or all of the hooked API calls monitored for another type of interpreter. A hooked API call invoked when the interpreter is part of the calling hierarchy would be monitored for presence of an anomalous (and potentially malicious) activity, which may cause classification logic within the threat detection system to conclude that an object under analysis is malicious and an exploit attack is being conducted on that interpreter.

More specifically, the hook framework is configured to intercept (hook) API calls. In response to initiating a hooked API call, a thread of execution, which pertains to the interpreter interpreting content from a script under analysis within the virtual machine that generated the API call, is halted until a response to the hooked API call is returned. Monitoring logic operating in cooperation with the hook framework tracks usage of the APIs corresponding to the hooked API calls, where usage of some APIs by the interpreter may be considered an anomalous activity. Responsive to the hooked API calls, virtualized system resources return information (e.g., pointer, data, etc.) to the hook framework, which routes the returned information to the thread of execution so that the interpreter continues virtual processing of the script. During processing of the script or after processing of the script has completed, the monitoring logic provides information associated with any detected anomalous activity or activities to classification logic to determine whether any detected anomalous activities denote an exploit attack on the interpreter.

The interception point framework(s) may further include an instrumentation framework, which utilizes interception points (herein also referred to as "instrumentations") that are placed within code associated with the interpreter to detect certain activities. Namely, according to one embodiment of the disclosure, each instrumentation (e.g., an inserted breakpoint, JUMP instruction, etc.) may be placed within code closely operating with the interpreter code or within the interpreter code itself. The instrumentations selected for monitoring one type of interpreter may partially or completely differ from those instrumentations selected for monitoring another type of interpreter. The instrumentation framework provides a higher level view of script processing, namely detailed state information associated with the interpreter at a time when the instrumentation is triggered. At that time, a thread of execution associated with the interpreter, which is interpreting content from a script under analysis with the virtual machine, is temporarily halted until processing control is returned to the interpreter. Monitoring logic operating in cooperation with the instrumentation framework tracks the triggering of the instrumentations and gathers state information of the interpreter when the instrumentations are triggered.

Stated differently, the instrumentation framework includes one or more instrumentations that, when accessed during script processing by the interpreter, cause processing of the script to be temporarily halted. At that time, the monitoring logic gains access to state information associated with the interpreter. The state information may include the memory location being accessed when the instrumentation hook is invoked, call trace information, the number of threads running, or the like. Thereafter, processing control is returned to the interpreter and the processing of the script continues.

As an illustrative example, suppose an interpreter is configured to only interpret simple memory and arithmetic instructions and perform relevant memory operations. Based on the type of interpreter, instrumentations associated with certain functionality of the interpreter may be set and/or API call hooks to intercept certain "anomalous" API calls for that type of interpreter may be set. During processing of an object (e.g., file, document, or other information including a script) within a virtual machine (VM), anomalous activities by the interpreter (e.g., new memory allocations, version checks, new thread creation etc.) are detected. Such detection may be accomplished by intercepting of anomalous activities by the interpreter through any of the interception point frameworks, followed by confirmation that the activities appear to have been initiated by the interpreter. The detection of these anomalous activities may identify that the interpreter is subject to an exploit attack. Thereafter, automated classification and reporting of the anomalous activities (along with data associated with the potential exploit attack) is conducted to ensure that a centralized management system or administrator is aware of the exploit attack.

It is contemplated that one or more interception point frameworks and monitoring logic may be deployed within an electronic device (i) as a kernel driver, or (ii) as part of a hypervisor. Interception points (hooks) directed to the hook framework may be placed into monitor logic (e.g., a dynamic linked library "DLL" code) injected into an application that utilizes an interpreter. The instrumentations may be placed into monitor logic injected to the interpreter.

Herein, the electronic device may be a standalone appliance adapted to receive data for analysis from a data source (e.g., a digital tap or connector that provides connectivity to a network, dedicated device from which data can be directly uploaded via a dedicated interconnect or peer-to-peer connection, etc.). Alternatively, the electronic device may be an endpoint device (e.g., cellular telephone, laptop computer, etc.) or any other electronic device with network connectivity capabilities.

The disclosure is directed to a system that detects malicious (e.g., exploit) attacks on various types of interpreters, where the system is scalable and is programmable where the interception frameworks may be configured to monitor for anomalous activity from different types of interpreters. The malware detection may be applicable to malware detection in kernel mode, such as VM-based kernel exploit detection for example, or in user mode. It is contemplated that, in lieu of detection of an exploit attack on an interpreter as described, the system may be utilized for detecting exploit attacks on another logic type, such as a Just-In-Time (JIT) compiler for example, where the compiler is instrumented and, as it generates code, intercept points may be placed into the code. The intercept points are used to detect API calls and instrumentation activities within the compiler itself.

I. Terminology

In the following description, certain terminology is used to describe features of the invention. For example, in certain situations, the terms "component" and "logic" are representative of hardware, firmware or software that is configured to perform one or more functions. As hardware, a component (or logic) may include circuitry having data processing or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC", etc.), a semiconductor memory, or combinatorial elements.

A component (or logic) may be software in the form of one or more software modules, such as executable code or an instance, an API, a subroutine, a function, a procedure, an applet, a servlet, a routine, source code, object code, a shared library/dynamic link library, or even one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "object" generally refers to a collection of data, whether in transit (e.g., over a network) or at rest (e.g., stored), often having a logical structure or organization that enables it to be classified for purposes of analysis for malware. During analysis, for example, the object may exhibit certain expected characteristics (e.g., expected internal content such as bit patterns, data structures, etc.) and, during processing, conduct certain expected activities. The object may also exhibit unexpected characteristics or conduct a set of unexpected activities that may offer evidence of the presence of malware (exploit) and potentially allow the object to be classified as part of a malicious (exploit) attack.

Examples of objects may include one or more flows or a self-contained element within a flow itself. A "flow" generally refers to related packets that are received, transmitted, or exchanged within a communication session. For convenience, a packet is broadly referred to as a series of bits or bytes having a prescribed format, which may, according to one embodiment, include packets, frames, or cells. Further, an object may correspond to a collection of data that may take the form of an individual or a number of packets carrying related payloads, e.g., a single webpage received over a network. Moreover, an object may be a file retrieved from a storage location over an interconnect.

As a self-contained element, the object may be an executable (e.g., an application, program, segment of code, dynamically link library "DLL", etc.) or a non-executable. Examples of non-executables may include a document (e.g., a Portable Document Format "PDF" document, Microsoft® Office® document, Microsoft® Excel® spreadsheet, etc.), an electronic mail (email), downloaded web page, or the like.

The term "activity" should be generally construed as a behavior conducted by a software component running on the computing device. The activity may occur that causes an undesired action to occur, such as stealing system tokens, injecting system code into a high privileged process, or modify kernel code that is involved at a higher privilege for example.

The term "framework" denotes an abstraction in which the corresponding software provides generic and configurable functionality that can be selectively changed.

The term "electronic device" should be generally construed as electronics with the data processing capability and/or a capability of connecting to any type of network, such as a public network (e.g., Internet), a private network (e.g., a wireless data telecommunication network, a local area network "LAN", etc.), or a combination of networks. Examples of an electronic device may include, but are not limited or restricted to, the following: an endpoint device (e.g., a laptop, a smartphone, a tablet, a desktop computer, a netbook, a medical device, or any general-purpose or special-purpose, user-controlled electronic device configured to support virtualization); a server; a mainframe; a router; or a security appliance that includes any system or subsystem configured to perform functions associated with malware detection and may be communicatively coupled to a network to intercept data routed to or from an endpoint device.

According to one embodiment, the term "malware" may be construed broadly as any code or activity that initiates a malicious attack and/or operations associated with anomalous or unwanted behavior. For instance, malware may correspond to a type of malicious computer code that executes an exploit to take advantage of a vulnerability, for example, to harm or co-opt operation of a network device or misappropriate, modify or delete data. In the alternative, malware may correspond to an exploit, namely information (e.g., executable code, data, command(s), etc.) that attempts to take advantage of a vulnerability in software and/or an action by a person gaining unauthorized access to one or more areas of a network device to cause the network device to experience undesirable or anomalous behaviors. The undesirable or anomalous behaviors may include a communication-based anomaly or an execution-based anomaly, which, for example, could (1) alter the functionality of an network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context. Additionally, malware may be code that initiates unwanted behavior which may be, as one example, uploading a contact list from an endpoint device to cloud storage without receiving permission from the user.

The term "interconnect" may be construed as a physical or logical communication path between two or more electronic devices. For instance, the communication path may include wired or wireless transmission mediums. Examples of wired transmission mediums and wireless transmission mediums may include electrical wiring, optical fiber, cable, bus trace, a radio unit that supports radio frequency (RF) signaling, or any other wired/wireless signal transfer mechanism.

The term "computerized" generally represents that any corresponding operations are conducted by hardware in combination with software or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. General System Architecture

Referring now to FIG. 1, an exemplary block diagram of a physical representation of an electronic device 100 (e.g., security appliance, endpoint device, etc.) is shown, where the electronic device 100 is configured as a threat detection system adapted to detect exploit attacks on an interpreter 180. The interpreter 180 may be deployed within kernel space or within user space of system memory. Herein, the electronic device 100 comprises one or more hardware processors (referred to as "processor(s)") 110, a memory 120, one or more network interfaces (referred to as "network interface(s)") 130, and one or more network devices (referred to as "network device(s)") 140 connected by a system interconnect 150, such as a bus. These components are at least partially encased in a housing 160, which is made entirely or partially of a rigid material (e.g., hardened plastic, metal, glass, composite, or any combination thereof) that protects these components from atmospheric conditions.

The processor(s) 110 is a multipurpose, programmable device that accepts digital data as input, processes the input data according to instructions stored in its system memory, and provides results as output. One example of a processor may include an Intel® x86 central processing unit (CPU) with an instruction set architecture. Alternatively, a processor may include another type of CPU, a digital signal processor (DSP), an Application Specific Integrated Circuit (ASIC), a field-programmable gate array (FPGA), or the like.

The network device(s) 140 may include various input/output (I/O) or peripheral devices, such as a keyboard, key pad, touch screen, or mouse for example. Each network interface 130 may include one or more network ports containing the mechanical, electrical and/or signaling circuitry needed to connect the electronic device 100 to a network to thereby facilitate communications to other remotely located electronic devices. To that end, the network interface(s) 130 may be configured to transmit and/or receive messages using a variety of communication protocols including, inter alia, Transmission Control Protocol/Internet Protocol (TCP/IP), Hypertext Transfer Protocol (HTTP), or HTTP Secure (HTTPS).

The memory 120 operates as system memory that may include different storage device types such as semiconductor memory (e.g., any type or random access memory, any type programmable read-only memory such as flash memory or any type of electrically erasable programmable read-only memory "EEPROM") or a storage device. One type of storage device may include a solid state drive (SSD) or a hard disk drive (HDD) into which one or more interpreters 180 (e.g., script interpreters) may be stored. From a logical perspective, the memory 120 includes a plurality of locations that are addressable by the processor(s) 110 and the network interface(s) 130 for storing software components (including software applications) and data structures associated with such software components. Examples of the stored software components may include some or all of the following: an operating system (OS) 170, one or more software applications 175, and/or one or more interpreters 180 which may be provided as guest software (residing in user space) or host software (residing in kernel space). An optional virtual machine monitor (sometimes referred to as a "VMM" or a "hypervisor") 190 and/or optional virtual system resources 195 may be other stored components.

The OS 170, resident in memory 120 and executed by the hardware processor(s) 110, functionally organizes the electronic device 100 by, inter alia, invoking operations in support of applications executing on the electronic device 100. Herein, the OS 170 features a kernel 172 running in the most privileged level (Ring-0). Examples of types of OSes may include, but are not limited or restricted to the following: (1) a version of a WINDOWS® series of operating system; (2) a version of a MAC OS® or an IOS® series of operating system; (3) a version of a LINUX® operating system; or (4) a versions of an ANDROID® operating system, among others.

A kernel driver 174 is loaded into the kernel 172 when a virtual machine (VM), which is used for in-depth, sandboxed analysis of an object for detecting a presence of a malware, is launched. The kernel driver 174 comprises interception point frameworks 176 and/or 178, which are configured to (i) intercept and monitor for certain types of activities conducted during processing of one or more interpreters 180 (hereinafter "interpreters") that are outside the limited set of activities expected for a particular interpreter being monitored, and (ii) determine that a detected activity is anomalous (e.g., unexpected, abnormal, etc.) upon confirmation that the particular interpreter initiated or is being utilized during such activity. The confirmation may involve an analysis that the particular interpreter is part of the calling hierarchy through an analysis of a call stack or call trace review.

III. Architecture of the Threat Detection System

Figure 2:
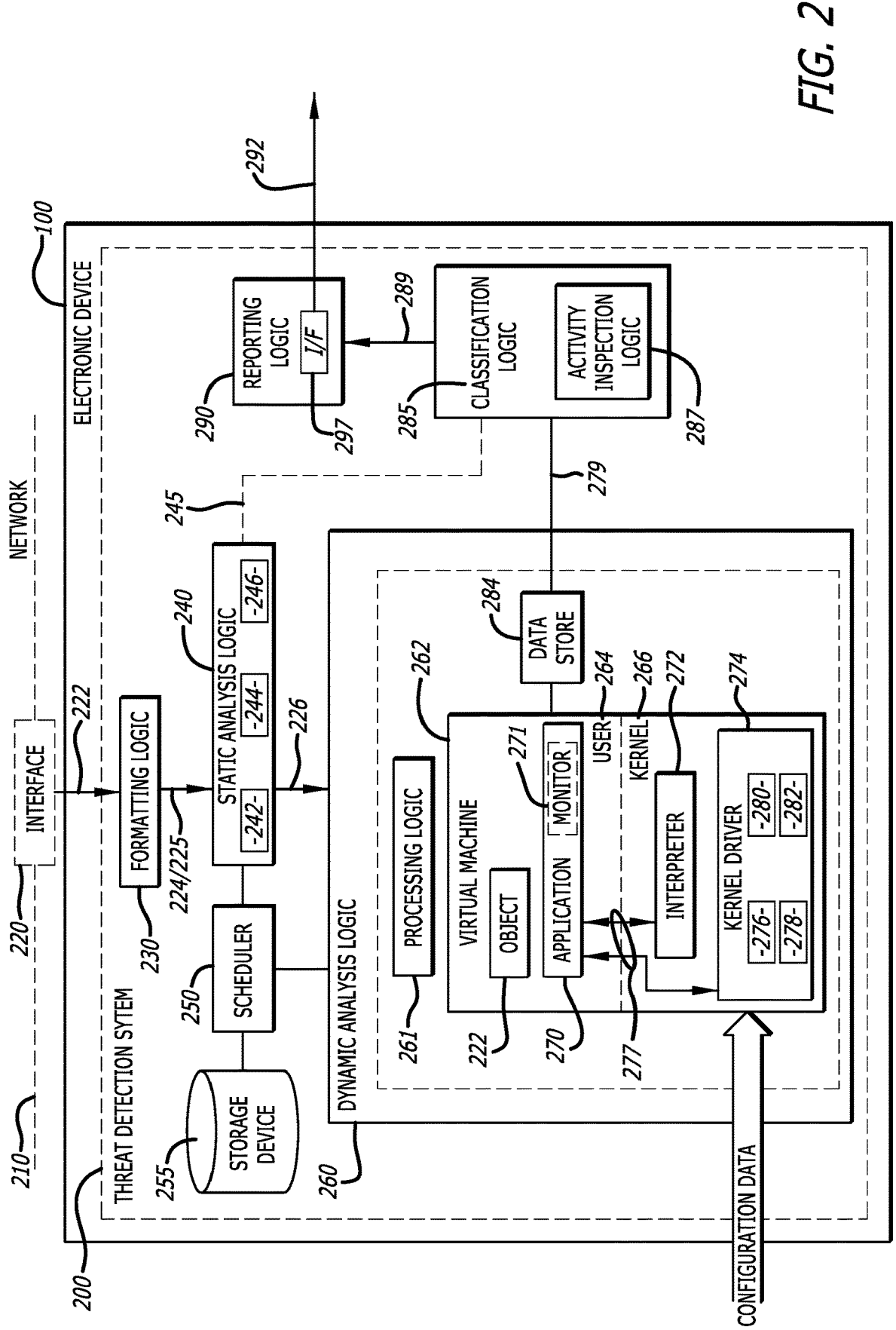
FIG. 2 is a first embodiment of the electronic device of FIG. 1 employing a threat detection system.

As shown in FIG. 2, a first embodiment of the electronic device 100 employing a threat detection system 200 is shown. The thread detection system 200 operates within the electronic device 100 and is adapted to analyze an object associated with incoming data (e.g., network traffic propagating over a communication network 210, input data from another type of transmission medium including a dedicated transmission medium, etc.). According to this illustrative embodiment, the threat detection system 200 may be communicatively coupled with the communication network 210 via an interface 220, where the communication network 210 may include a public network such as the Internet, a private network (e.g., a local area network "LAN", wireless LAN, etc.), or a combination thereof. The interface 220 operates as a data capturing device that intercepts (or alternatively duplicates) at least a portion of the received data, namely an object for analysis 222 and/or metadata associated with the incoming object 222. Alternatively, although not shown, the interface 220 may be configured to receive files or other types of objects that are not provided over a network. For instance, as an illustrative example, the interface 220 may be a data capturing device that automatically (or on command) accesses data stored in a storage system or another type of interface, such as a port, for receiving objects manually provided via a suitable dedicated communication link or from storage media such as portable flash drives.

In some embodiments, although not shown, interface 220 may be contained within the electronic device 100 as part of the threat detection system 200. In other embodiments, the interface 220 can be integrated into an intermediary device in the communication path (e.g., an optional firewall, router, switch or other networked electronic device) or can be a standalone component, such as an appropriate commercially available network tap.

For this illustrative embodiment, however, the interface 220 may be configured to capture data associated with the incoming object 222 for analysis, and perhaps its corresponding metadata (or generate metadata based on the captured data). The metadata may be used, at least in part by the formatting logic 230, to determine protocols, application types and other information that may be used by other logic (e.g., a scheduler 250 or a virtual machine monitor not shown) within the threat detection system 200 to determine a particular software profile used in virtual machine (VM) configuration and/or VM operation scheduling. For instance, one or more software profiles may be used for selecting and configuring one or more virtual machines (e.g., VM 262) operating within dynamic analysis logic 260. These software profile(s) may be directed to different software or different versions of the same software application extracted from software image(s) fetched from a storage device 255.

As further shown in FIG. 2, the threat detection system 200 includes the formatting logic 230, static analysis logic 240, the scheduler 250, the storage device 255, dynamic analysis logic 260, classification logic 285, and/or reporting logic 290. Herein, according to this embodiment of the disclosure, the formatting logic 230 receives the incoming object 222 and converts that object into a format, if needed or as appropriate, on which scanning may be conducted by the static analysis logic 240. This conversion may involve decompression of the object for example. It is contemplated that the formatting logic 230 may conduct de-compilation, disassembly or other de-obfuscation activities on the object 222 and/or extraction of specific data associated with the object 222. However, as shown below, the de-obfuscation and data extraction activities may be handled by logic within the static analysis logic 240.

Referring still to FIG. 2, the static analysis logic 240 comprises de-obfuscation logic 242, analysis logic 244 and extraction logic 246. The de-obfuscation logic 242 is configured to de-obfuscate at least a portion of the formatted object 224 received from the formatting logic 230. As an example, the de-obfuscation logic 242 may be configured to de-obfuscate, such as decompile or disassemble, at least a portion of the formatted object 224 (e.g., a flash file, a document or a web page with an embedded script) to recover a script 225.

After de-obfuscation, as an optional analysis stage, the analysis logic 244 may analyze content within the script 225 that has been extracted from the formatted object 224. Such analysis may include, but is not limited or restricted to, an analysis of the script type and an analysis for the presence of certain API calls within the script 225. In response to determining that the script 225 includes content that, at run-time, would issue a particular API call, the extraction logic 246 may extract one or more characteristics (hereinafter "characteristic(s)") associated with the script 225, such as the script type, targeted interpreter name, function name coded to issue the particular API call, the API name, data associated with the size of the formatted object 224, or the like. According to this embodiment of the disclosure, the extracted characteristic(s) may be provided as static analysis (SA)-based results 245 to activity inspection logic 287 of the classification logic 285 for subsequent analysis. Additionally or in the alternative, the analysis logic 244 may analyze content within the script 225 by performing one or more checks on content associated with the script 225 without its execution. Examples of the checks may include signature checks, which may involve a comparison of content that is part of the high-level representation of the script 225 to one or more pre-stored signatures associated with content that, within a script executed by a particular interpreter, would be anomalous.

Additionally, or in the alternative, after de-obfuscation, the analysis logic 244 analyzes content within the formatted object 224. As before, the analysis may include, but is not limited or restricted to, an analysis to determine the type of object (e.g., flash file, uniform resource locator "URL", web page, etc.), the presence of a script with the formatted object 224, the script type, and/or the presence of certain API calls within the script. In response to determining that the formatted object 224 includes content that includes a script (e.g. flash file) or has a high propensity for executing a script at run-time (e.g., URL), the extraction logic 246 may extract characteristic(s) associated with the object (e.g., object name, object type, size, path, domain name, or query string). According to this embodiment of the disclosure, the extracted characteristic(s) may be provided as static analysis (SA)-based results 245 to activity inspection logic 287 of the classification logic 285 for subsequent analysis. The analysis logic 244 may analyze content within the formatted object 224 by performing one or more checks on such content without execution of the formatted object 224.

It is contemplated that the static analysis logic 240 may further include processing circuitry (not shown) that is responsible for extracting or generating metadata contained within or otherwise associated with incoming data from the formatting logic 230 (e.g., network traffic, downloaded data). This metadata may be subsequently used for configuring one or more VMs (e.g., VM 262) within the dynamic analysis logic 260 for conducting a dynamic analysis of an object associated with that metadata.

Additionally, after analysis of the formatted object 224 or script 225 has been completed, the static analysis logic 240 may provide at least some of the information associated with the analyzed formatted object 224 or script 225 (hereinafter generally referred to as "suspicious object" 226) to the dynamic analysis logic 260 for in-depth dynamic analysis by the VM 262. For instance, according to one embodiment of the disclosure, the VM 262 may be adapted to run an application 270 that processes the suspicious object 226 in user mode 264. During processing of the suspicious object 226, the application 270 may need a particular interpreter 272 operating in kernel mode 266 as shown (or operating in user mode 264 depending on the script type) to parse and/or process information that is part of the suspicious object 226. For instance, where the suspicious object 226 is a flash file, during processing by application 270, a group of instructions within bytecode is interpreted by a flash interpreter (in user mode 264) into native code that is executed. Where the suspicious object 226 is JavaScript®, during processing by application 270, the JavaScript® interpreter (in user mode 264) parses each command line and interprets the same into native code for subsequent execution. Where the suspicious object 226 is a font file, during processing by application 270, a group of instructions within bytecode is interpreted by the font interpreter (in kernel mode 266) into native code that is executed.

According to one embodiment, in operation alongside the interpreter 272, a kernel driver 274 is loaded into the kernel 266. Operating in kernel mode, the kernel driver 274 comprises interception point frameworks 276 and/or 278, which are configured to intercept and monitor certain types of activities exhibited during processing of the suspicious object 226 within the VM 262. These interception point frameworks comprise a hook framework 276 and an instrumentation framework 278. The kernel driver 274 further comprises monitoring logic 280 and correlation logic 282 operating in concert with the interception point frameworks 276 and/or 278.

After loading, the kernel driver 274 conducts a multi-stage initialization process in response to a launching of the application 270 for processing the suspicious object 226. During the launch of the application 270, monitor logic 271 is loaded. During or after loading of the monitor logic 271, the hook framework 276 may insert intercept points (sometimes referred to as "hooks") at certain locations within the monitor logic 271 to allow the hook framework 276 to intercept one or more function calls 277, which may be Application Programming Interface (API) call(s), in order to track usage of that particular API. These "hooked" API calls may vary from one object type (and corresponding interpreter) to another, but normally are not mutually exclusive (i.e. partial overlap exists). An API (system) call 277 directed to one of the hooked APIs, where usage of the API call by an interpreter being part of the calling hierarchy might be considered an anomalous (and potentially malicious) activity, is intercepted by the hook framework 276. Information associated with the API call 277 may be extracted and stored for subsequent use by the classification logic 285 within the threat detection system 200 in its determination as to whether the suspicious object 226 is malicious and whether an exploit attack is being conducted on the interpreter 272.

More specifically, the hook framework 276 is configured to intercept certain API calls 277 associated with a certain type activity (or certain types of activities), including a system call directed to an API that is normally not accessed by the particular interpreter 272. In response to initiating the API call 277, a thread that is processing a portion of the script that initiated the API call 277 is halted until a response to the API call 277 is returned. The monitoring logic 280 tracks usage of certain APIs, especially any API invoked while the interpreter 272 is part of the calling hierarchy (e.g., by the interpreter 272 or logic operating in conjunction with the interpreter). In some embodiments, an attempted access to these certain APIs by the interpreter 272 (blacklist access control) may be considered an anomalous activity. In other embodiments, the interpreter 272 deviating by invoking an API call other than the certain APIs (whitelist access control) may be considered an anomalous activity.

Virtualized system resources (not shown) returns information (e.g., pointer, data, etc.) in response to the API call and virtual processing of the script continues. During virtual processing or after virtual processing of the script has completed, the monitoring logic 280 and the correlation logic 282 may be configured to provide information associated with any detected anomalous activity or activities to the classification logic 285, which determines whether any detected anomalous activities denote an exploit attack on the interpreter 272.

In summary, the hook framework 276 may be used to intercept one or more selected API calls or equivalent operating system (e.g., guest or host OS) function calls that are considered anomalous API calls for that particular interpreter 272. The hook framework 276 includes logic that extract one or more features (e.g., arguments, etc.) from the API call 277. Similarly, these features may include a name of the function identified in the function call (e.g., API name), or other data within the arguments of the function call issued (or triggered) by the suspicious object 226 during processing within the VM 262. The features may be stored in a data store 284 and are subsequently provided to (or accessible by) the classification logic 285 as part of VM-based results 279.

It is contemplated that, although not shown, where the interpreter 272 is deployed within the user mode 264, such as for the handling of flash or JAVASCRIPT® for example, it is contemplated that the monitor logic 271 may be configured with the functionality of the hook framework 276, the instrumentation framework 278, the monitoring logic 280 and the correlation logic 282 in order to obtain control of the processing flow at the user level. For example, the hook framework 276 may be configured to intercept calls associated from a script residing within the application 270, such as an API call 277 directed to the kernel driver 274 or any other of function calls directed to user-mode resources or kernel-based resources. The monitoring logic 280 may be configured to track behavior of the script (and the virtual machine 262 at large) based on the monitored API calls or accesses to functions to determine whether such behavior is anomalous. The correlation logic 282 may be configured to provide information associated with any detected anomalous activity or activities to the classification logic 285.

As another alternative, in lieu of API hooking, traps instructions may be set so that control is diverted to a hypervisor or logic within the user mode 264 itself.

Referring still to FIG. 2, during execution of the suspicious object 226, the application 270 may load the interpreter 272. Around that time, the instrumentation framework 278 may insert intercept points (referred to as "instrumentations") to detect a certain type of activity that is anomalous (e.g., abnormal, unexpected, etc.) for that interpreter. This activity may correspond to an attempted access to a certain function of the interpreter 272. Namely, each instrumentation may be placed within code operating in concert with the interpreter 272 or within the monitored interpreter code itself. The instrumentation for one type of interpreter may readily differ from an instrumentation for another type of interpreter. The instrumentation framework 278 provides a higher level view of script processing, by collecting higher level state information associated with the interpreter 272. To be stored in the data store 284 and subsequently provided to (or accessible by) the classification logic 285 as part of VM-based results 279, the state information may include the memory location being accessed when the instrumentation is triggered, call trace information, the number of threads running, or the like. The thread that invoked the instrumentation is temporarily halted, and after capturing information associated with this monitored activity, the halt is released and processing of suspicious object 226 by the interpreter 272 may continue.

Herein, the scheduler 250 may be adapted to configure one or more VMs (e.g. VM 262) based on metadata associated with the suspicious object 226 in order to conduct run-time processing of the suspicious object 226 within the configured VM 262. Although not shown, for a multiple VM deployment, a first VM and a second VM may be configured to run concurrently (i.e. overlapping at least in part in time), where each of these VMs may be configured with different software profiles corresponding to software images stored within the storage device 255. As an alternative embodiment, the VM 262 may be configured to run plural processes concurrently or sequentially, each process configured according to a software configuration that may be used by different electronic devices or prevalent types of software configurations (e.g., a particular version of Windows® OS or a particular version of a web browser with a particular application plug-in). It is contemplated that the VM configuration described above may be handled by logic other than the scheduler 250.

According to one embodiment of the disclosure, the dynamic analysis logic 260 features one or more VMs, where each generally simulates the processing of the suspicious object 226 within a run-time environment. For instance, as an optional feature, the dynamic analysis logic 260 may include processing logic 261 that is configured to provide anticipated signaling to the VM 262 during virtual processing of the suspicious object 226, and as such, emulates a source of or destination for communications with the suspicious object 226 while processed within the VM 262. As an example, the processing logic 261 may be adapted to operate by providing simulated key inputs from a keyboard, keypad or touch screen or providing certain signaling, as requested by the suspicious object 226 during run-time.

As shown in FIG. 2, the static analysis logic 240 may be adapted to provide SA-based results 245 to the classification logic 285 while the dynamic analysis logic 260 may be adapted to provide the VM-based results 279 to the classification logic 285. According to one embodiment of the disclosure, the SA-based results 245 may include information obtained by analyzing the formatted object 224 that is potentially indicative of malware (e.g., function names, object size, suspicious strings within the object 224). Similarly, the VM-based results 279 may include information associated with the suspicious object 226 as well as the function calls that invoke abnormal API calls or unexpected functions for example.

According to one embodiment of the disclosure, the classification logic 285 includes the activity inspection logic 287 that is configured to receive the SA-based results 245 and/or the VM-based results 279. Based at least partially on the SA-based results 245 and/or VM-based results 279, the activity inspection logic 287 evaluates the characteristic(s) within the SA-based results 245 and/or the monitored activities associated with the VM-based results 279 to determine whether the suspicious object 226 should be classified as "malicious". The evaluation may receive one or more features as input, either individually or as a pattern of two or more features, and produces a result that may be used to identify whether the suspicious object 226 is associated with a malicious attack. Alternatively, the evaluation may be based on data acquired through machine learning.

For instance, provided with the VM-based results 279, the activity inspection logic 287 may conduct a probabilistic modeling process that assigns risk levels to different activities captured by the dynamic analysis logic 260. The risk levels may be aggregated to produce a value that denotes whether the suspicious object 226 is malicious (i.e. associated with an exploit attack on the interpreter 272). Upon determining that the interpreter 272 is subject to an exploit attack, the classification logic 285 may provide information 289 to identify the malicious object, including information that identifies one or more of the monitored activities, to the reporting logic 290.

The reporting logic 290 is configured to receive information 289 from the classification logic 285 and generate alert signals 292, especially in response to the suspicious object 226 being now classified as malicious. The alert signals 292 may include various types of messages, which may include text messages, email messages, video or audio stream, or other types of information over a wired or wireless communication path. The reporting logic 290 features an optional user interface 294 (e.g., touch pad, keyed inputs, etc.) for customization as to the reporting configuration.

Figure 3:
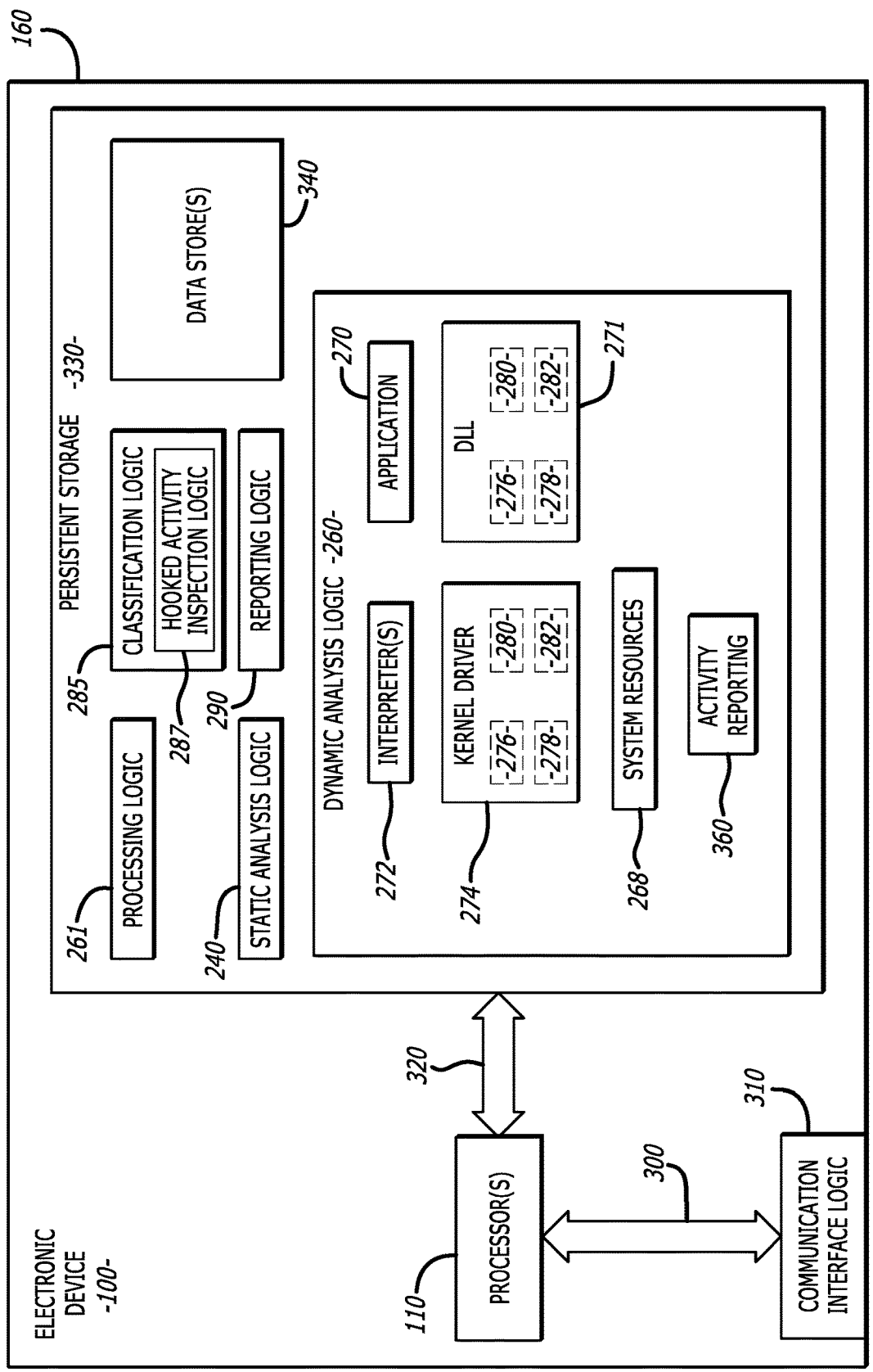
FIG. 3 is an exemplary embodiment of a physical representation of the electronic device of FIG. 2 deploying the threat detection system.

Referring now to FIG. 3, an exemplary embodiment of a physical representation of the electronic device 100 deploying the threat detection system 200 of FIG. 2 is shown. The electronic device 100 features the housing 160, which is made entirely or partially of a rigid material (e.g., hardened plastic, metal, glass, composite or any combination thereof) that protect circuitry within the housing 160. Coupled via a first transmission medium 300, the circuitry is coupled to communication interface logic 310, which may be implemented as one of the network interfaces 130, namely a physical interface including one or more ports for wired connectors. Additionally, or in the alternative, the communication interface logic 310 may be implemented as one or more radio units for supporting wireless communications with other electronic devices.

A persistent storage 330 is configured to store software components that are part of the threat detection system, namely the kernel driver 274 implemented with at least interception point frameworks 276 and/or 278 and monitoring logic 280. The software components are processed by processor(s) 110 communicatively coupled to the persistent storage 330 via a second transmission medium 320. The persistent storage 330 may be a combination of the memory 120 and at least one of the network devices 140 that may include a device with a large amount of storage capability such as a solid state drive (SSD) or a hard disk drive (HDD).

According to one embodiment of the disclosure, the persistent storage 330 may include (a) the static analysis logic 240; (b) the dynamic analysis logic 260; (c) classification logic 285; (d) reporting logic 290; and/or (e) one or more data stores 340 that may be utilized by static analysis logic 240, dynamic analysis logic 260, classification logic 285 including activity inspection logic 287, and/or reporting logic 290. One or more of these logic units could be implemented externally from the threat detection system 200.

Additionally, the persistent storage 330 further stores one or more interpreters 272 and the kernel driver 274, which is loaded as part of the kernel code utilized by a virtual machine that is in operation during processing of the dynamic analysis logic 260. The kernel driver 274 may comprises the hook framework 276, the instrumentation framework 278, monitoring logic 280, and correlation logic 282. Alternately, the monitor logic 271 may be configured with the functionality of the hook framework 276, the instrumentation framework 278, the monitoring logic 280, and the correlation logic 282 to detect exploit attacks on the interpreter 272 that resides in the user mode 264. As described above, both the hook framework 276 and the instrumentation framework 278 are configured to (i) detect certain types of activities that are outside the limited set of activities expected for a particular interpreter 272 and (ii) determine that one or more of these detected activities are anomalous (e.g., unexpected, abnormal, etc.) upon confirmation that the particular interpreter 272 initiated such activity through analysis of the calling hierarchy (e.g., stack analysis or call trace review). Hook framework 276 is configured to detect functions calls directed to APIs or other OS functions to access system resources 268 that may represent an anomalous activity while the instrumentation framework 278 is configured to detect access to certain functions within or closely interacting with the interpreter 272 that may also represent a non-anomalous activity.

The information associated with the monitored API calls or accesses to functions with the interpreter is monitored by the monitoring logic 280. Given that multiple processes or threads involving interpreter operations may be operating concurrently, or multiple processes or threads associated with different interpreters may be operating concurrently, the correlation logic 282 is adapted to aggregate monitored data in accordance with any desired grouping. One grouping may be based on the suspicious object under analysis. Another grouping may be based on interpreter type.

An activity reporting logic 360 formats data received from the monitoring logic 280 and correlation logic 282, which aggregates and categorizes the monitored data received from the hook framework 276 and/or instrumentation framework 278. The activity reporting logic 360 is responsible for re-formatting the data received from the monitoring logic 280 (and/or correlation logic 282) into a format that is recognized and used by the classification logic 285.

When implemented as hardware circuitry, the static analysis engine 240 may be configured to be communicatively coupled to communication interface logic 310 and/or the classification engine 285. The dynamic analysis engine 260 may further be communicatively coupled to the communication interface logic 310, the static analysis engine 240, and/or the classification engine 285. The classification engine 285 is communicatively coupled to the reporting logic 290.

Figure 4:
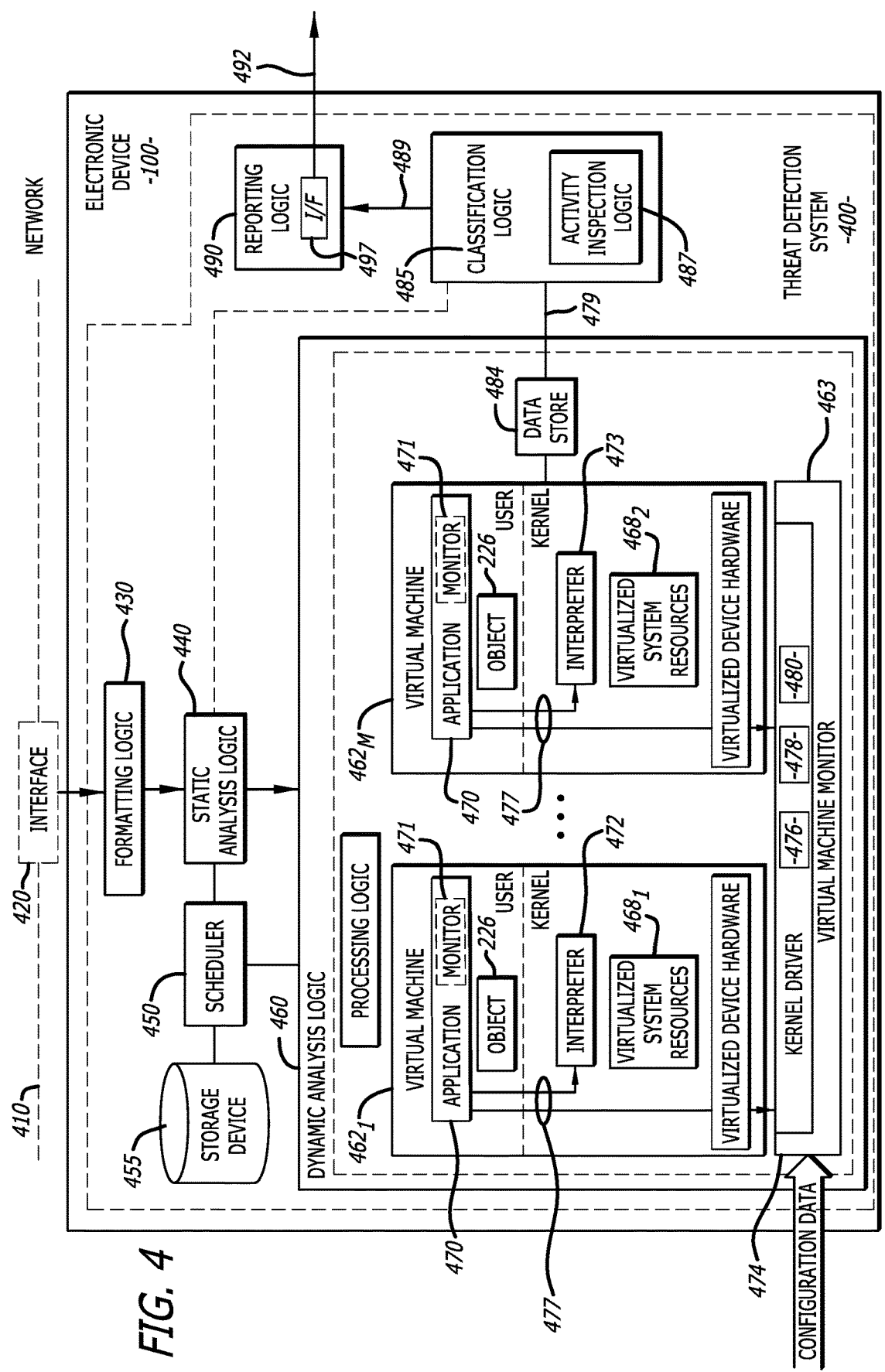
FIG. 4 is a second embodiment of the electronic device of FIG. 1 employing a threat detection system.

Referring now to FIG. 4, a second embodiment of the electronic device 100 employing the threat detection system 200 is shown. Herein, the formatting logic 430, static analysis logic 440, scheduler 450, storage device 455, classification logic 485, and/or reporting logic 490 operate similarly to the formatting logic 230, static analysis logic 240, scheduler 250, storage device 255, classification logic 285, and/or reporting logic 290 of FIG. 2. However, the dynamic analysis logic 460, which is responsible for conducting in-depth dynamic analysis of the suspicious object 226, comprises two or more virtual machines (VM) $462_1$-$462_M$ (M>1), which provides processing capabilities for the suspicious object 226 within a virtual run-time environment. For instance, the dynamic analysis engine 460 comprises a virtual machine monitor (VMM) 463, sometimes referred to as a "hypervisor," which is configured to detect and classify calls received from the VMs $462_1$-$462_M$.

Additionally, the VMM 463 may emulate and provide anticipated signaling to the VM(s) $462_1$, ..., and/or $462_M$ during virtual processing. As an example, the VMM 463 may be configured to obtain information associated with the call received from one of the VMs $462_1$-$462_M$ (e.g., VM $462_1$). For instance, when the VMM 463 detects a call, virtual machine memory inspection logic "VM_MI" (not shown), which is part of the VMM 463, accesses certain portions of the virtualized system resources 468 (e.g., one or more registers of the virtual processor "vCPU", virtualized memory, etc.) to identify the type of call detected. The VMM 463 may obtain a call identifier (e.g., a value that uniquely represents the call type) and additional parameters associated with the call.

The kernel driver 474 (described above as kernel driver 274 of FIG. 2) is installed within the VMM 463. The hook framework 476, which is part of the kernel driver 474, may be configured to detect calls initiated by the interpreter 472 or an application 470 processing the suspicious object 226 within the first VM $462_1$ to certain OS system functions or API. Additionally, the hook framework 476 deployed within the VMM 463 may be configured to detect calls initiated by applications or interpreters operating in other VMs (e.g., second VM $462_2$, etc.).

As described above, after loading, the kernel driver 474 conducts a multi-stage initialization process in response to a launching of the application 470 for processing the suspicious object 226. During the launch of the application 470, the monitor logic 471 are loaded. During or after loading of the monitor logic 471, the hook framework 476 of the VMM 463 may insert intercept points (or hooks) at certain system functions within the monitor logic 471 to allow the hook framework 476 to detect a function call (e.g., API call 477) that invokes a particular API and tracks usage of that particular API. Information associated with the API call 477 may be extracted by the hook framework 476 or monitoring logic 480 and stored for subsequent use by the classification logic 485. The classification logic 485 within the threat detection system 400 is responsible for determining whether the suspicious object 226 is malicious and an exploit attack is being conducted on the interpreter 472.

More specifically, the hook framework 476 is configured to intercept a first set of API calls associated with a certain type activity (or certain types of activities) that are directed to an API that is normally not accessed by the particular interpreter 472 operating within the first VM $462_1$ as well as a second set of API calls associated with a certain type activity (or certain types of activities) that are directed to an API that is normally not accessed by the particular interpreter 473 operating within the second VM $462_2$.

In response to detecting an API call 477 that is part of the first set of API calls, an active thread or process, which is running in the first VM $462_1$ and involved in the processing of a portion of the script that caused invocation of the API call, is halted until a response to the API call 477 is returned. Hook framework 476 operating in cooperation with the monitoring logic 480 tracks usage of this API associated with the hooked API call when the interpreter 472 is part of the calling hierarchy and usage of the API by the interpreter 472 is considered an anomalous activity. The virtualized system resources 468 returns information 469 (e.g., pointer, data, etc.) in response to the API call 477 and virtual processing of the script continues. The hook framework 476 further support API calls 475 initiated by an active thread or process, which is running in the second VM $462_2$ and involved in the processing of a portion of the script that caused invocation of the API call 475.

In summary, the hook framework 476 may be used to intercept (i) function calls directed to one or more selected APIs or equivalent operating system (e.g., guest or host OS) functions that are considered anomalous API calls for the interpreter 472 operating within the first VM $462_1$ as well as (ii) function calls directed to one or more selected APIs or equivalent OS functions that are considered anomalous API calls for the interpreter 473 operating within the second VM $462_2$. The hook framework 476 includes logic that extracts one or more features (e.g., arguments, etc.) from the function call. Similarly, these features may include a name of the function identified in the function call (e.g., API name), or other data within the arguments of the function call issued (or triggered) by the suspicious object 226 during processing within the first VM $462_1$ or the second VM $462_2$. The features may be stored in a data store 484 and are subsequently provided to (or accessible by) the classification logic 485 as part of VM-based results 479.

The kernel driver 474 further comprises the instrumentation framework 478 which, as described above, inserts intercept points (referred to as "instrumentations") to prescribed locations within the interpreters 472 and 473 (or code operating with the interpreters 472 and 473) to detect certain types of activities that are anomalous (e.g., abnormal, unexpected, etc.) for these interpreters. These activities may correspond to attempted accesses of certain functions of the interpreters 472 and 473. The instrumentation framework 478 provides a higher level view of script/bytecode processing, by collecting higher level state information associated with the interpreters 472 and 473 being monitored.

As described above, it is contemplated that, where the interpreter 472 is positioned in the user mode, the operations of the hook framework 476 and the instrumentation framework 478 may be conducted in the user mode to intercept (or hook) certain system functions within the monitor logic 471. This allows for the detection of user-mode based exploit attacks. Additionally, as stated above, the monitoring logic 480 may reside in the user mode as well.

IV. General Operational Flow

Figure 5:
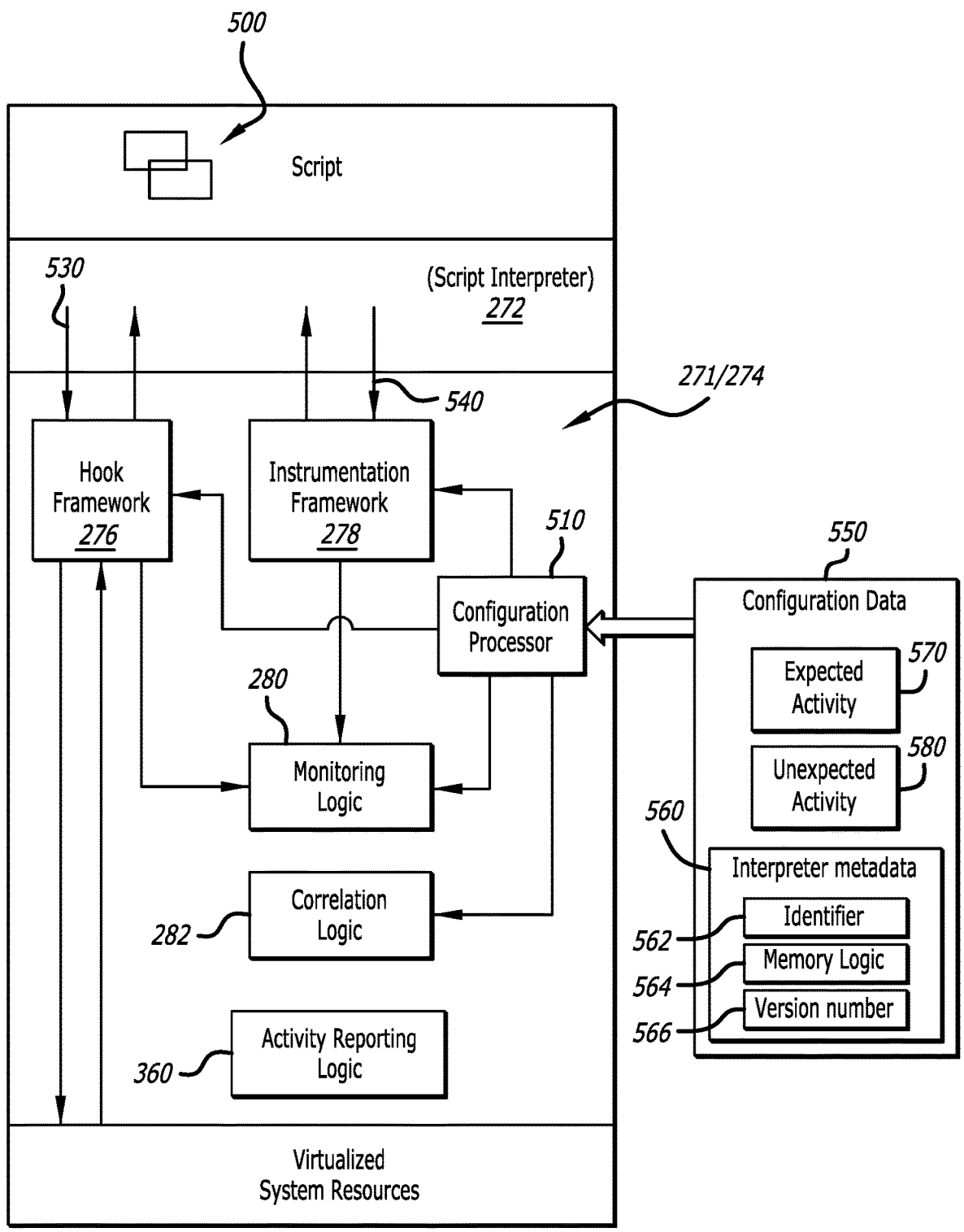
FIG. 5 is an exemplary embodiment of a stack illustrating a flow of operations controlled by the hook framework and instrumentation framework within the kernel driver of the threat detection system.

Referring to FIG. 5, an exemplary embodiment of a stack illustrating a flow of operations controlled by the hook framework 276 and instrumentation framework 278 of FIG. 2 is shown. The flow of operations associated with the hook framework 476 and instrumentation framework 478 of FIG. 4 are similar to the below-described operations of the hook framework 276 and instrumentation framework 278 of FIG. 2, albeit the frameworks 476/478 support flows within multiple virtual machines.

Herein, as shown in FIG. 5, a script 500 is executed by an application, which invokes the interpreter 272 of FIG. 2. After loading of the kernel driver 274 into the kernel space associated with the VM 262, where the kernel driver 274 includes the hook framework 276, instrumentation framework 274, monitoring logic 280, correlation logic 282, activity reporting logic 360 and configuration processor 510, the kernel driver 274 conducts a multi-stage initialization process in response to a launching of an application that is processing the script 500. During the launch of the application, the hook framework 276 may insert intercept points ("hooks") at certain locations within monitor logic 271 that may be injected into the application that is processing the script 500. The hooks may operate as JUMP instructions to a prescribed memory location associated with the hook framework 276, which intercepts at least one call 530 that invokes a particular Application Programming Interface (API). The hook framework 276 tracks usage of that particular API. More specifically, upon intercepting the system (API) call 530, information associated with the API call 530 may be extracted and stored. The information provides evidence of an exploit attack on the interpreter 272 when the interpreter 272 is confirmed to be part of the calling hierarchy so that the system (API) call 530 is considered an abnormal (and potentially malicious) activity. This confirmation may be conducted by the hook framework 276, monitoring logic 280, correlation logic 282 or at the classification logic outside the sandboxed environment created by the VM.

Further shown in FIG. 5, during execution of the script 500, the application may load the interpreter 272. Around that time, the instrumentation framework 278 may insert intercept points ("instrumentations") to detect a certain type of activity 540 that is anomalous (e.g., abnormal, unexpected, etc.) for the interpreter 272. This activity may correspond to an attempted access to a certain function of the interpreter 272. Hence, the instrumentation framework 278 may provide a higher level view of script processing, by collecting higher level state information associated with the interpreter 272. The state information provides evidence of an exploit attack when the interpreter 272 is invoking functions at different times, functions in a different sequence than normally observed, functions that are unexpectedly invoked.

The configuration processor 510 is adapted to receive configuration data (or file) 550 that comprises information to assist in the hooking and/or instrumenting of code operating with the VM during analysis of the suspicious object 226 including the script 500. The information includes interpreter metadata 560, expected activities 570 for the interpreter 272, and unexpected activities 580 for the interpreter 272. The interpreter metadata 560 comprises information that assists the interception point frameworks to control the interception of API calls and setting intercept points within the interpreter 272. This information includes an identifier 562 of the type of script 500 under analysis, a memory location 564 (e.g., user space or kernel space) that may indirectly categorize the type of interpreter under analysis, a version number 566 to identify the particular version of the interpreter (where multiple versions of the interpreter exist).

The expected activities 570 may be used by the hook framework 276 and/or instrumentation framework 278 as a white list for the internal and system-wide functions that are expected for use by each particular interpreter. In contrast, the unexpected activities 580 may be used by the hook framework 276 and/or instrumentation framework 278 as a black list that signifies intercept points (hooks) directed to calls (e.g., system, function, API calls) as well as intercept points (instrumentations) directed to internal functions within the interpreter 272.

V. General Endpoint Architecture

Figure 6:
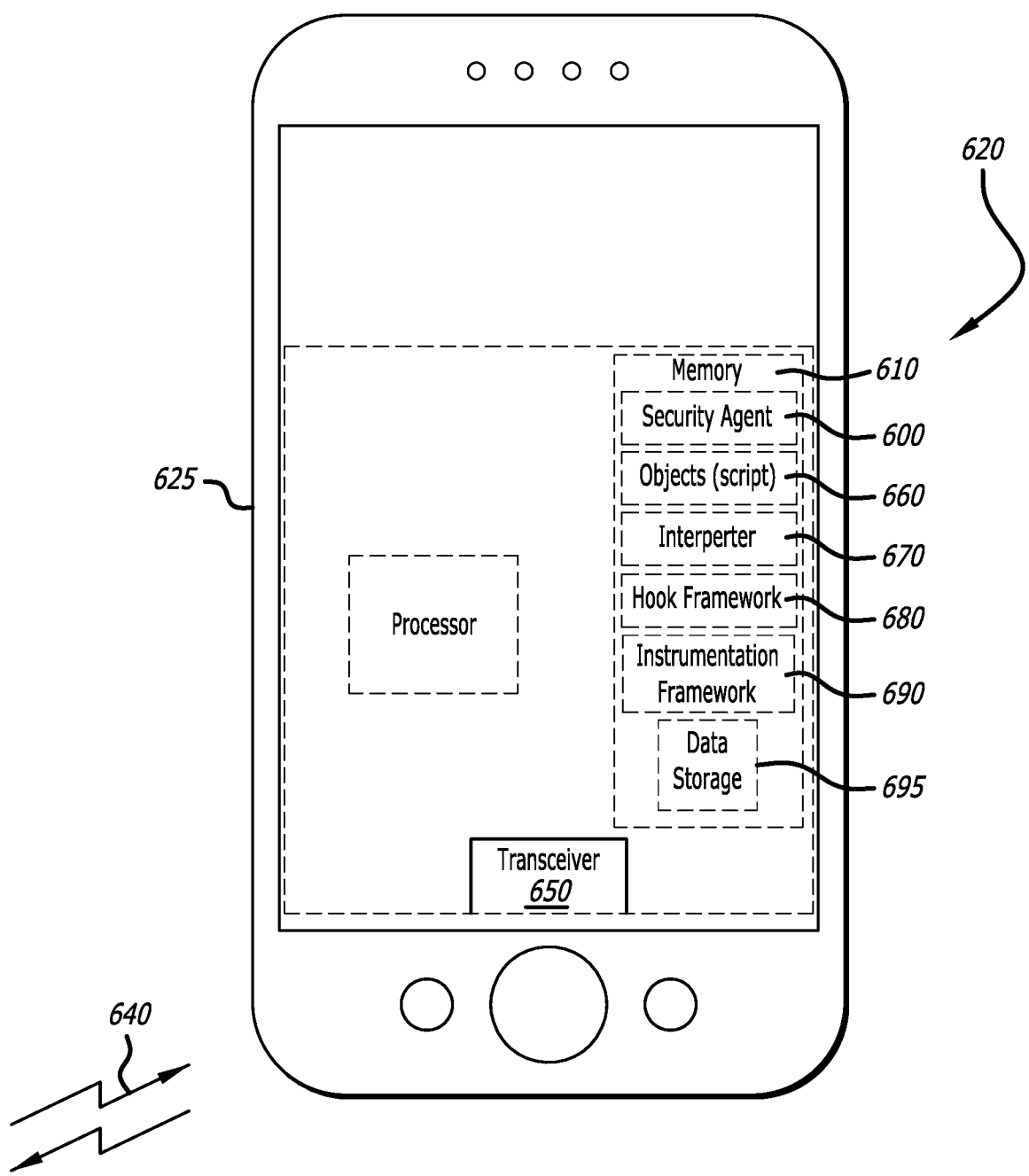
FIG. 6 is an exemplary embodiment of an endpoint device that features a security agent for detecting exploit attacks on an interpreter.

Referring now to FIG. 6, a system for detecting exploit attacks on an interpreter also may be performed by a security agent 600. Herein, the security agent 600 is stored within a memory 610 encased within a housing 625 of an endpoint device 620. Upon execution by a processor 630, the security agent 600 conducts dynamic analysis of at least a portion of information 640 received by a transceiver 650 of the endpoint device 620. Operating during normal run-time or as part of a sandboxed environment that is operating concurrently (e.g., at least partially at the same time) or alternatively with other run-time processes, the security agent 600 conducts dynamic (virtual) analysis of at least the portion of the information, including the suspicious object 126. The dynamic analysis includes processing of the script 660 that is part of the suspicious object and invokes an interpreter 670. The hook framework 680 and the instrumentation framework 690 monitor API calls and attempted accesses to segments of code within the interpreter 670, as described above. These monitored activities are stored in a data store 695 within the memory 610 along with the identifier associated with the monitored activity or identification of a system function invoked by the interpreter 670.

In the foregoing description, the invention is described with reference to specific exemplary embodiments thereof. It will, however, be evident that various modifications and changes may be made thereto without departing from the broader spirit and scope of the invention as set forth in the appended claims. For instance, in lieu of a detection of an exploit attack on an interpreter, the interception point framework(s) may be utilized for a Just-In-Time (JIT) compiler. Additionally, the anomalous behavior may be determined by detecting activity other than hooked system or API calls.

What is claimed is:

1. A non-transitory storage medium including software, executed by a processor and operating within a virtual machine, to detect an exploit attack on an interpreter based on processing of an object by an application in the virtual machine and detecting a loading of interpreter by the application, the software comprising:
   a hook framework that, responsive to launching of the application, is configured to insert one or more intercept points into the interpreter or software operating in cooperation with the interpreter for detecting calls associated with one or more types of activities that are normally not conducted by the interpreter and represent a potential exploit attack; and
   an instrumentation framework configured to insert one or more intercept points into the interpreter instrumented as a first type of interpreter or software operating in cooperation with the interpreter to detect any activities conducted by the interpreter that differ from activities conducted by the first type of interpreter and represent a potential exploit attack.

2. The non-transitory storage medium of claim 1, wherein the one or more intercept points inserted by the hook framework are configured to detect a certain type or types of Application Programming Interface (API) calls.

3. The non-transitory storage medium of claim 1, wherein the one or more intercept points inserted by the hook framework are configured to detect a different type or types of Application Programming Interface (API) calls, depending on a type of the interpreter.

4. The non-transitory storage medium of claim 1, wherein the one or more intercept points inserted by the hook framework are configured to detect one or more Application Programming Interface (API) calls each corresponding to a selected software call of the calls associated with one or more types of activities, where the detected one or more API calls being an anomalous activity by the interpreter.

5. The non-transitory storage medium of claim 1, wherein the software operating in cooperation with the interpreter includes software being part of a kernel driver.

6. The non-transitory storage medium of claim 5, wherein the software further comprises monitoring logic to track activities associated with the certain type or types of API calls after detection.

7. The non-transitory storage medium of claim 6, wherein the kernel driver further comprises a correlation logic to aggregate and categorize the monitored data from the monitoring logic in order to determine whether any detected anomalous activities denote an exploit attack on the interpreter.

8. The non-transitory storage medium of claim 1, wherein the instrumentation framework further collects state information associated with the interpreter.

9. The non-transitory storage medium of claim 8, wherein the state information provides evidence of an exploit attack when the interpreter is invoking (i) functions at different times, (ii) functions in a different sequence than normally observed, or (iii) functions unexpectedly.

10. The non-transitory storage medium of claim 1, wherein the hook framework is configured to intercept system calls including Application Programming Interface (API) calls and the instrumentation framework is configured to collect state information associated with the interpreter.

11. The non-transitory storage medium of claim 1 further comprising classification logic communicatively coupled to the hook framework and the instrumentation framework, the classification logic being configured to determine whether any anomalous activities detected by the hook framework and any anomalous activities detected by the instrumentation framework denote an exploit attack on the interpreter.

12. The non-transitory storage medium of claim 11 further comprising reporting logic communicatively coupled to the classification logic, the reporting logic being configured to generate an alert signal to identify that the object is classified as malicious.

13. A computerized method for detecting an exploit attack on a software component based on processing of an object by an application in a virtual machine, comprising:
   detecting a loading of the software component by the application when processing of the object;
   responsive to launching of the application, inserting one or more intercept points, by a hook framework, into the software component or software operating in cooperation with the software component for detecting calls associated with one or more types of activities that are normally not conducted by the software component and represent a potential exploit attack; and
   inserting one or more intercept points, by an instrumentation framework, into either (i) the software component instrumented as a first type of software component or (ii) software operating in cooperation with the software component to detect any activities conducted by the software component that differ from activities conducted by the first type of software component and represent a potential exploit attack.

14. The computerized method of claim 13, wherein the one or more intercept points inserted by the hook framework are configured to detect a certain type or types of Application Programming Interface (API) calls.

15. The computerized method of claim 13, wherein the software component is an interpreter.

16. The computerized method of claim 15, wherein the one or more intercept points inserted by the hook framework are configured to detect a different type or types of Application Programming Interface (API) calls, depending on a type of the interpreter.

17. The computerized method of claim 15, wherein the one or more intercept points inserted by the hook framework are configured to detect one or more Application Programming Interface (API) calls each corresponding to a selected software call of the calls associated with one or more types of activities, where the detected one or more API calls being an anomalous activity by the interpreter.

18. The computerized method of claim 15, wherein the software operating in cooperation with the interpreter includes software being part of a kernel driver.

19. The computerized method of claim 18, wherein the software further comprises monitoring logic to track activities associated with the certain type or types of API calls after detection.

20. The computerized method of claim 19, wherein the kernel driver further comprises a correlation logic to aggregate and categorize the monitored data from the monitoring logic in order to determine whether any detected anomalous activities denote an exploit attack on the interpreter.

21. The computerized method of claim 15 further comprising collecting, by the instrumentation framework, state information associated with the interpreter.

22. The computerized method of claim 21, wherein the state information provides evidence of an exploit attack when the interpreter is invoking (i) functions at different times, (ii) functions in a different sequence than normally observed, or (iii) functions unexpectedly.

23. The computerized method of claim 15 further comprising intercepting system calls including Application Programming Interface (API) calls by the hook framework and collecting state information associated with the interpreter from the instrumentation framework.

24. The computerized method of claim 13, wherein the software component includes a Just-In-Time (JIT) compiler.

25. The computerized method of claim 13 further comprising:
determining, by classification logic communicatively coupled to the hook framework and the instrumentation framework, whether any anomalous activities detected by the hook framework and any anomalous activities detected by the instrumentation framework denote an exploit attack on the software component.

26. The computerized method of claim 25 further comprising:
generating an alert signal, by reporting logic communicatively coupled to the classification logic, to identify that the object is classified as malicious.

27. A system for detecting an exploit attack on a software component, comprising:
one or more processors; and
a non-transitory storage medium communicatively coupled to the one or more processors, the non-transitory storage medium includes software, when executed by the one or more processors, to (i) process an object by an application in a virtual machine, and (ii) detect a launching of the software component by the application when processing the object;
wherein the software further comprising:
a hook framework that, responsive to the launching of the application, is configured to insert one or more intercept points into the software component or software operating in cooperation with the software component for detecting calls associated with one or more types of activities that are normally not conducted by the software component and represent a potential exploit attack, and
an instrumentation framework configured to insert one or more intercept points into either (i) the software component instrumented as a first type of software component or (ii) software operating in cooperation with the software component to detect any activities conducted by the software component that differ from activities conducted by the first type of software component and represent a potential exploit attack.

28. The system of claim 27, wherein the one or more intercept points inserted by the hook framework are configured to detect a certain type or types of Application Programming Interface (API) calls.

29. The system of claim 27, wherein the software component is an interpreter.

30. The system of claim 29, wherein the one or more intercept points inserted by the hook framework are configured to detect a different type or types of Application Programming Interface (API) calls, depending on a type of the interpreter.

31. The system of claim 29, wherein the one or more intercept points inserted by the hook framework are configured to detect one or more Application Programming Interface (API) calls each corresponding to a selected software call of the calls associated with one or more types of activities, where the detected one or more API calls being an anomalous activity by the interpreter.

32. The system of claim 29, wherein the software operating in cooperation with the interpreter includes software being part of a kernel driver.

33. The system of claim 32, wherein the software further comprises monitoring logic to track activities associated with the certain type or types of API calls after detection.

34. The system of claim 33, wherein the kernel driver further comprises a correlation logic to aggregate and categorize the monitored data from the monitoring logic in order to determine whether any detected anomalous activities denote an exploit attack on the interpreter.

35. The system of claim 29, wherein the instrumentation framework further collects state information associated with the interpreter.

36. The system of claim 35, wherein the state information provides evidence of an exploit attack when the interpreter is invoking (i) functions at different times, (ii) functions in a different sequence than normally observed, or (iii) functions unexpectedly.

37. The system of claim 29, wherein the hook framework is configured to intercept system calls including Application Programming Interface (API) calls and the instrumentation framework is configured to collect state information associated with the interpreter.

38. The system of claim 27, wherein the software component includes a Just-In-Time (JIT) compiler.

39. The system of claim 27 further comprising classification logic communicatively coupled to the hook framework and the instrumentation framework, the classification logic being configured to determine whether any anomalous activities detected by the hook framework and any anomalous activities detected by the instrumentation framework denote an exploit attack on the software component.

40. The system of claim 39 further comprising reporting logic communicatively coupled to the classification logic, the reporting logic being configured to generate an alert signal to identify that the object is classified as malicious.

41. The system of claim 27, wherein the one or more processors correspond to one or more hardware processors.

\* \* \* \* \*